(12) United States Patent
Schropp et al.

(10) Patent No.: US 10,125,832 B2
(45) Date of Patent: *Nov. 13, 2018

(54) DISC BRAKE AND BRAKE PAD SET

(71) Applicants: Bendix Spicer Foundation Brake LLC, Elyria, OH (US); KNORR-BREMSE Systeme fuer Nutzfahrzeuge GmbH, Munich (DE)

(72) Inventors: Josef Schropp, Eichendorf (DE); Manfred Schoenauer, Munich (DE); Wolfgang Pahle, Bad Wiessee (DE); Markus Bartel, Munich (DE); Tobias Fischl, Munich (DE); Johann Baumgartner, Moosburg (DE); Andreas Petschke, Passau (DE); Markus Bohmann, Neufahrn bei Freising (DE); Richard Lantz, Clinton, OH (US); Robert Tekesky, Elyria, OH (US)

(73) Assignees: KNORR-BREMSE Systeme fuer Nutzfahrzeuge GmbH, Munich (DE); Bendix Spicer Foundation Brake LLC, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/059,817

(22) Filed: Mar. 3, 2016

(65) Prior Publication Data

US 2017/0138425 A1 May 18, 2017

Related U.S. Application Data

(63) Continuation-in-part of application No. 14/939,748, filed on Nov. 12, 2015, and a continuation-in-part of application No. 14/939,735, filed on Nov. 12, 2015.

(51) Int. Cl.
*F16D 65/02* (2006.01)
*F16D 65/097* (2006.01)
(Continued)

(52) U.S. Cl.
CPC ..... *F16D 65/0974* (2013.01); *F16D 55/2255* (2013.01); *F16D 65/0056* (2013.01); *F16D 65/0068* (2013.01); *F16D 2065/026* (2013.01)

(58) Field of Classification Search
CPC .............. F16D 65/0974; F16D 55/225; F16D 65/0973; F16D 65/092; F16D 55/226;
(Continued)

(56) References Cited

U.S. PATENT DOCUMENTS 3,920,104 A   11/1975   Hoffmann
4,699,255 A * 10/1987   Claverie ............... F16D 55/224
                                                              188/73.38

(Continued)

FOREIGN PATENT DOCUMENTS

DE   20 2008 013 446 U1   5/2009
DE   10 2012 002 734 A1   8/2013
(Continued)

OTHER PUBLICATIONS

International Search Report (PCT/ISA/220 & PCT/ISA/210) issued in PCT Application No. PCT/US2017/019616 dated May 19, 2017 (Three (3) pages).
(Continued)

*Primary Examiner* — Pamela Rodriguez
(74) *Attorney, Agent, or Firm* — Crowell & Moring LLP

(57) ABSTRACT

A disc brake for a vehicle, in particular for a commercial vehicle, includes a brake carrier which receives at least two brake pads in respective clamping side and rear side pad slots, with the at least one brake pad on the clamping side being held in its pad slot in a form-fitting manner. The at
(Continued)

least one brake pad on the clamping side is provided with at least one pad retaining spring which is supported at least on a brake carrier horn of the pad slot of the brake carrier. The at least one clamping spring exerts a tensile force acting radially outward on the brake pad. A brake pad set for the disc brake is also provided.

52 Claims, 26 Drawing Sheets

(51) Int. Cl.
    *F16D 55/2255*     (2006.01)
    *F16D 65/00*     (2006.01)

(58) Field of Classification Search
    CPC .............. F16D 55/2225; F16D 65/0056; F16D 65/0068; F16D 2065/026
    USPC ........... 188/73.38, 73.1, 73.36, 73.37, 73.31, 188/73.32, 250 G
    See application file for complete search history.

(56) References Cited

U.S. PATENT DOCUMENTS

| | | | |
|---|---|---|---|
| 6,003,642 A | | 12/1999 | Mori et al. |
| 8,016,084 B2 * | | 9/2011 | Camilo-Martinez ........................ F16D 65/092 188/250 G |
| 8,540,061 B1 | | 9/2013 | Plantan et al. |
| 8,544,614 B1 | | 10/2013 | Plantan et al. |
| 2005/0194223 A1 | | 9/2005 | Murayama |
| 2006/0054425 A1 * | | 3/2006 | Maehara ............... F16D 55/226 188/71.1 |
| 2014/0345983 A1 | | 11/2014 | Baumgartner et al. |
| 2015/0008080 A1 * | | 1/2015 | Baumgartner ........ F16D 55/226 188/72.3 |
| 2015/0211589 A1 | | 7/2015 | Mallmann |
| 2016/0160945 A1 | | 6/2016 | Gasslbauer |

FOREIGN PATENT DOCUMENTS

EP     2 050 978 A2     4/2009
WO     WO 2013/143993 A1     10/2013

OTHER PUBLICATIONS

Written Opinion (PCT/ISA/237) issued in PCT Application No. PCT/US2017/019616 dated May 19, 2017 (Six (6) pages).

International Preliminary Report on Patentability (PCT/IB/326 & PCT/IB/373) issued in PCT Application No. PCT/US2017/019616 dated Sep. 13, 2018 (two pages).

* cited by examiner

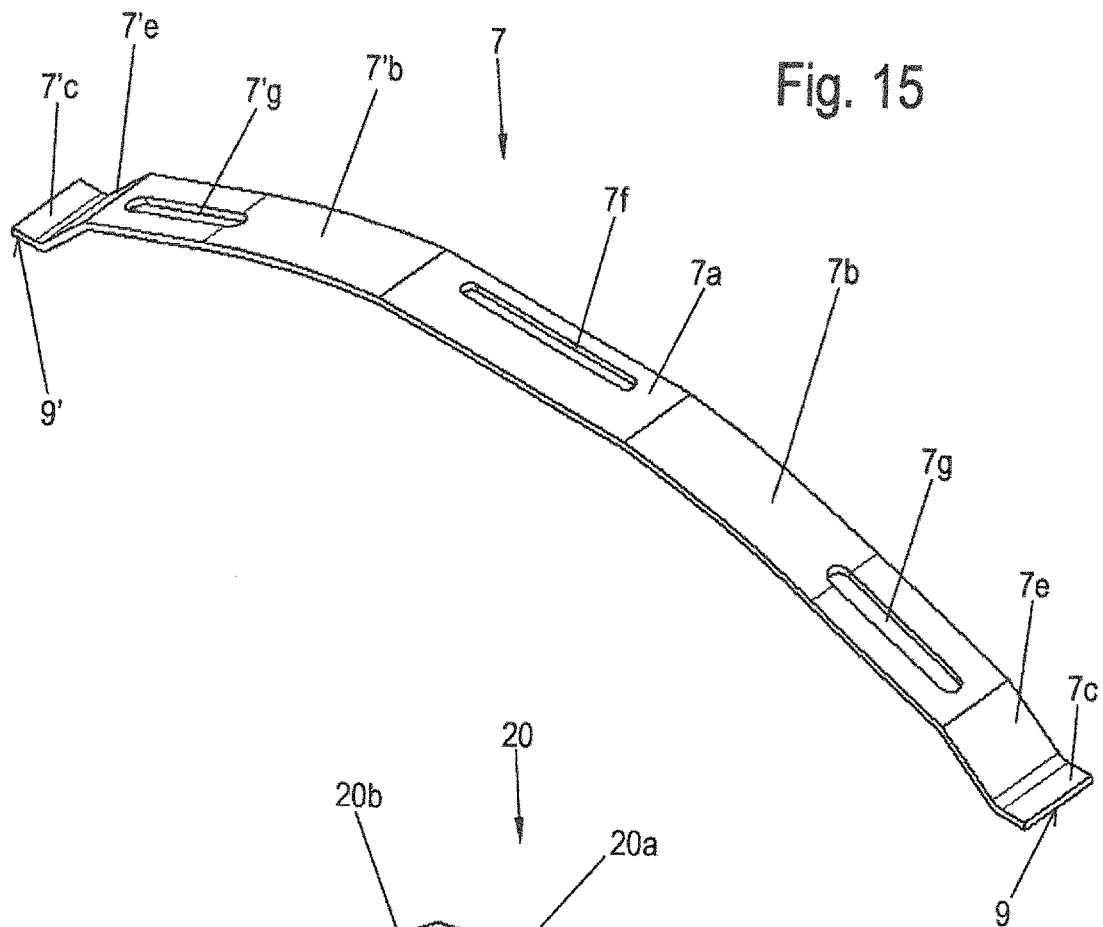

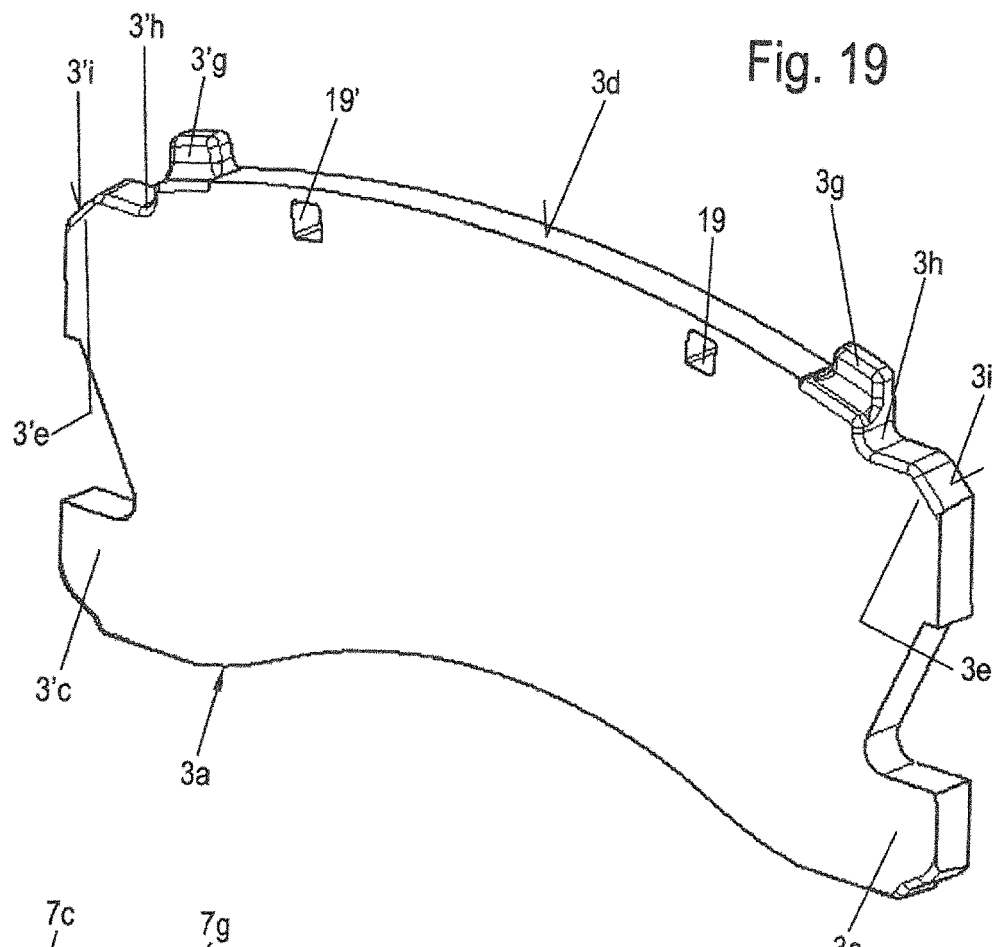
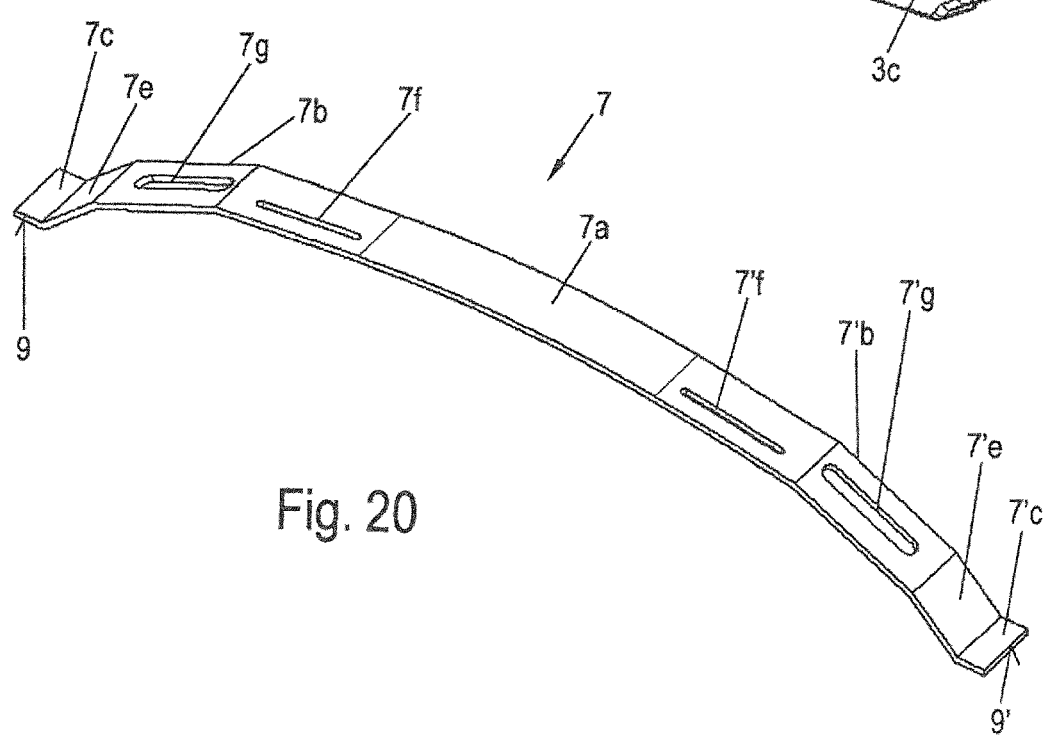

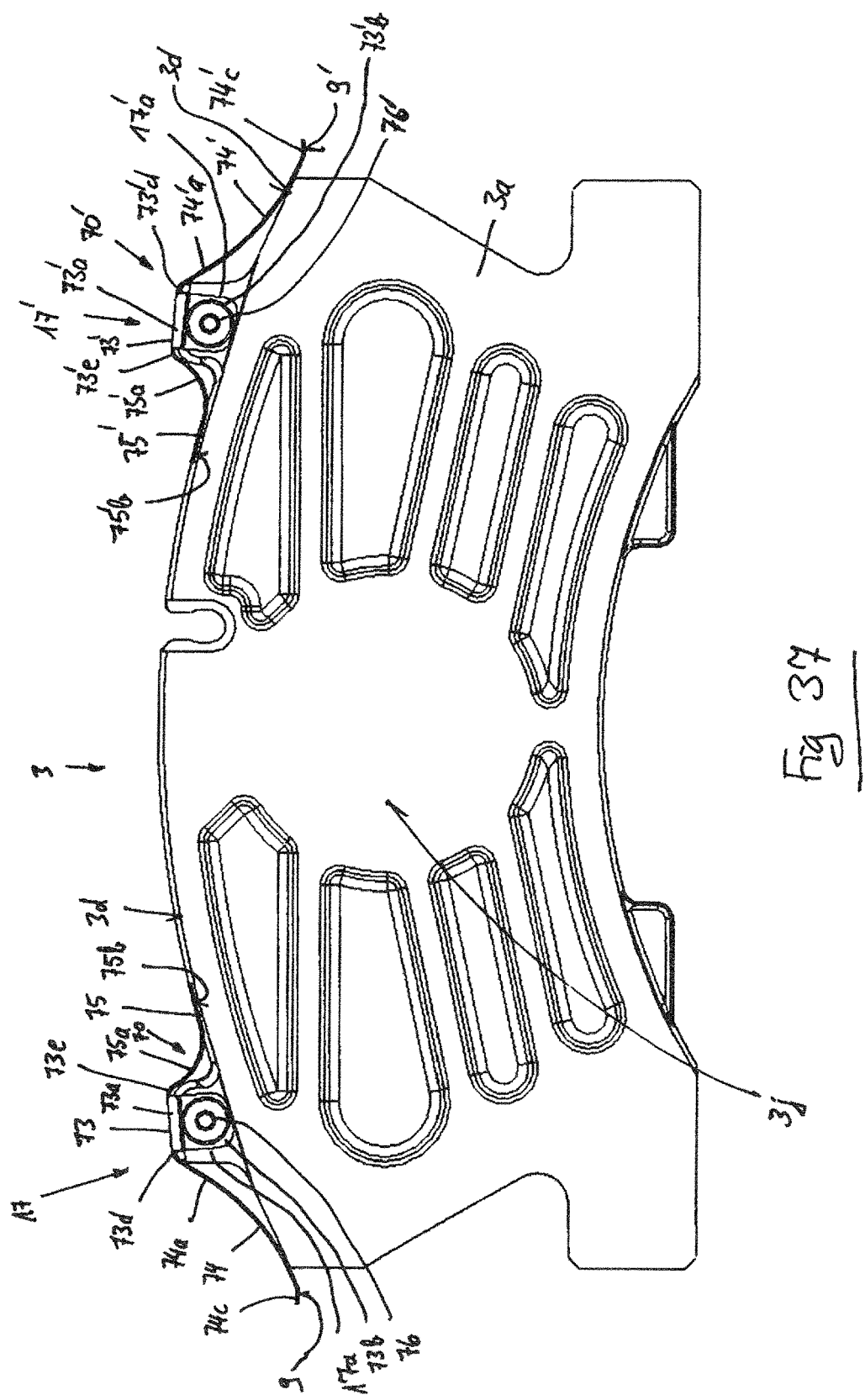

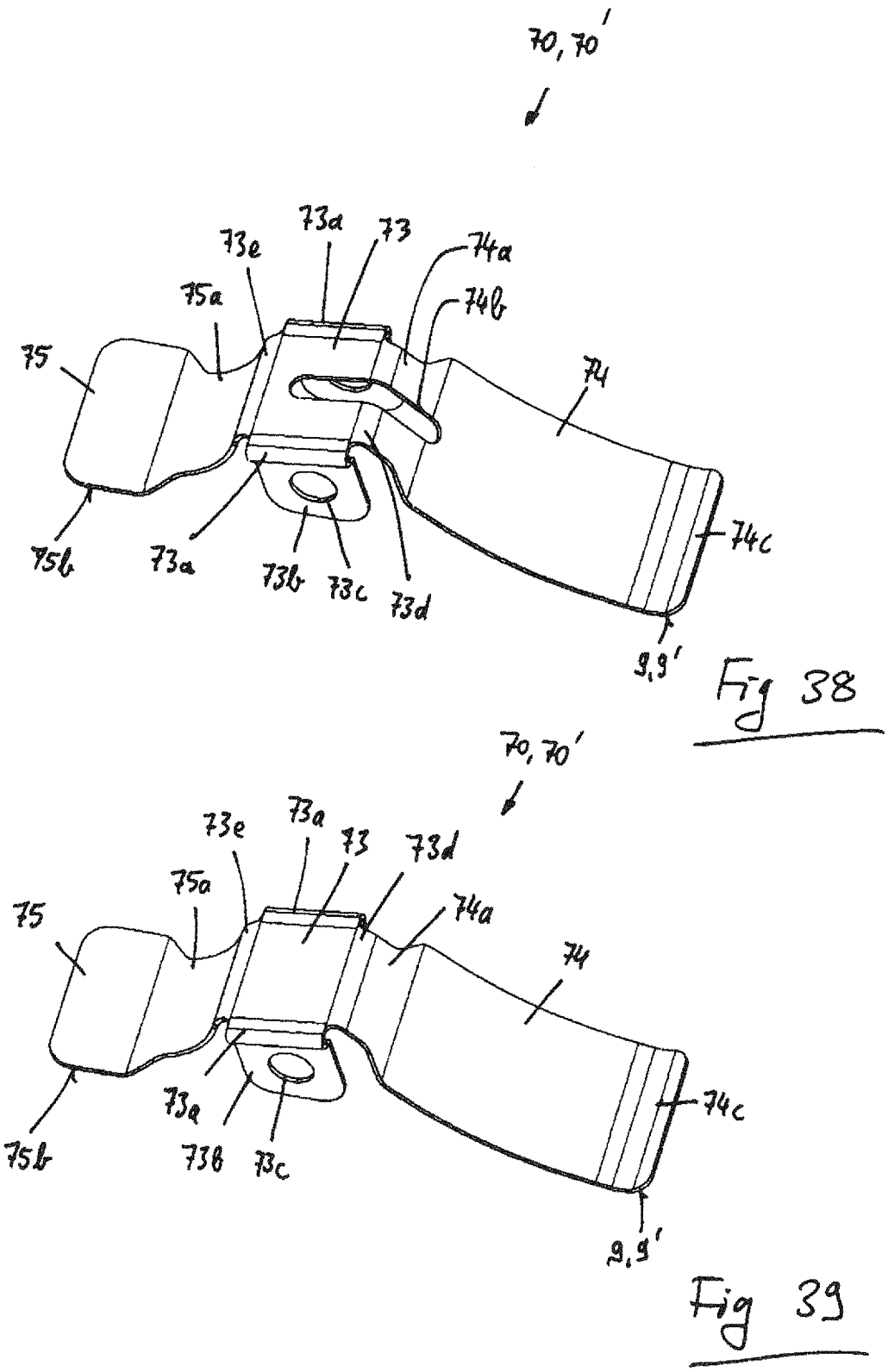

DISC BRAKE AND BRAKE PAD SET

CROSS REFERENCE TO RELATED APPLICATIONS

This application is a Continuation-in-Part of U.S. application Ser. Nos. 14/939,735 and 14/939,748, both filed Nov. 12, 2015, the entire disclosures of which are herein expressly incorporated by reference.

BACKGROUND AND SUMMARY OF THE INVENTION

The present invention relates to a disc brake according to the preamble of claim 1. The invention also relates to a brake pad set for a disc brake.

Such disc brakes are used in commercial vehicles in particular and are often provided with pneumatic actuation. One embodiment of the brake caliper of such a disc brake is designed as a disc caliper and is used in a tight installation space, for example.

The brake caliper is usually connected to the so-called brake carrier by two bearing spars, which are designed as fixed bearings and loose bearings. The brake pads of the disc brakes are guided displaceably in the brake carrier and are held in a spring-loaded connection by pad retainer brackets in pad slots in the brake carrier.

In the case of disc brakes, in particular disc brakes having only one force-introducing element, uneven wear may occur on the brake pads due to the design. The brake pads may develop wear that is not parallel relative to a plane through their pad carrier plates in the radial direction, on the one hand, but also in the circumferential direction. This is referred to as radial wear and tangential wear, respectively.

One example of a spring-loaded pad retaining bracket is described in german patent document no. DE 20 2008 013 446 U1.

Brake pad retainer systems are disclosed in International patent document no. WO 2013/143993 A1, German patent document no. DE 10 2012 002 734 A1, and U.S. Pat. No. 8,540,061 B1.

Against the background of these approaches, there is still a constant demand for brakes and brake components that have a longer lifetime with a reduced cost at the same time.

An object of this invention is therefore to create an improved disc brake.

Another object is to provide an improved brake pad set for a disc brake.

The invention achieves these and other objects, by a disc brake for a vehicle, in particular for a commercial vehicle, which includes a brake disc having an axis of rotation, at least one brake pad on the clamping side and one brake pad on the rear side, a brake carrier which holds at least two brake pads in a respective pad slot, the at least one brake pad on the clamping side being held in a form-fitting manner in the respective pad slot, a brake caliper designed as a disc caliper and extends beyond the brake disc, wherein the brake pad on the clamping side is provided with at least one pad retaining spring supported at least on a brake carrier horn of the pad slot of the brake carrier and exerts a tensile force on the brake pad acting radially outward.

The tensile force acting radially outward makes it possible for the brake pad to be pulled into its form-fitting retainer, thus advantageously permitting a reduction in tangential wear.

It is possible to create the tensile force through an advantageously simple arrangement with at least one pad retaining spring, which is supported on a brake carrier horn of the pad slot after the brake pad has been installed.

In addition, there is the advantage that the pad retaining spring is no longer supported on a pad retainer bracket and the brake pad with the pad rear plate can no longer strike the pad retaining spring. Therefore, damage to the pad retaining spring can be reduced and its lifetime can be increased.

In one embodiment, the at least one brake pad on the clamping side is engaged in a form-fitting manner with a pad rear plate in the pad slot of the brake carrier with contours of brake carrier horns. This advantageously makes it possible to secure the brake pad on the clamping side in both radial directions with respect to the axis of rotation of the brake disc.

In another embodiment, it is provided that the contours of the brake carrier horns correspond to the contours of the pad rear plate, wherein undercut surfaces of the contours of the brake carrier horns are each engaged, free of play, with undercut surfaces of protrusions on the pad rear plate. It is therefore possible to further improve the reduction in wear.

In another embodiment, the at least one pad retaining spring is mounted on the pad rear plate. This creates a compact brake pad.

The at least one pad retaining spring may be mounted on the top side of the pad rear plate, which permits space savings.

Yet another embodiment provides that the at least one pad retaining spring comprises a central section, arms, pressure sections and transitional sections, wherein the central section is mounted on the top side of the pad rear plate, wherein the transitional sections sit on the top side of the pad rear plate, and the pressure sections protrude laterally away from the pad rear plate, each on one end of the top side of the pad rear plate. Thus, a simple and effective prestressing of the pad retaining spring can be created. The pad retaining spring may be a flat spring steel, for example, from which it is produced as a punched bending part.

In one alternative embodiment, the at least one pad retaining spring has a central section, arms, pressure sections and intermediate sections, wherein the central section is mounted on the pad rear plate with at least one mounting element, wherein the pressure sections protrude laterally from the pad rear plate, one section on each end of the top side of the pad rear plate. This advantageously makes it possible to use available fastening elements with only minor changes or without any changes at all.

To do so, the at least one fastening element may be designed like a clamp and may have a cross section which extends through an opening in the pad rear plate in the installed state of the pad retaining spring, such that the pad retaining spring is arranged between the at least one fastening element and the top side of the pad rear plate. This is advantageous because the pad retaining spring is in this way in a captive mount on the pad rear plate of the brake pad. Another advantage is the play in the central part of the pad retaining spring between the fastening element and the pad rear plate, so that a uniform load on the pad retaining spring can be achieved.

In another embodiment, the pad retaining spring has at least one slot through which a section of the at least one fastening element extends. Thus, for example, punching tools that are present may be used for slots in pad retaining springs. Furthermore, a captive mount is possible between the pad retaining spring and the fastening element.

According to yet another embodiment, the pad retaining spring has at least one additional slot, through which a guide protrusion on the pad rear plate extends. In this way, the pad retaining spring on the top side of the pad rear plate can advantageously be held, so that it is centered on the top side and is guided in its possible longitudinal movements, so that contacting of the pressure sections with the brake carrier horns remains ensured.

When at least one of the pressure sections is supported on the at least one brake carrier horn of the pad slot of the brake carrier, an advantageously simple tensile force is created on the brake pad and no additional measures are required on the brake carrier.

In one alternative embodiment, the at least one pad retaining spring is mounted on a top side of the pad rear plate by means of at least one spring retainer. This permits advantageous weight savings.

Another embodiment provides that the at least one spring retainer has at least one retaining element, wherein the at least one pad retaining spring is arranged between the at least one retaining element and the top side of the pad rear plate and is held prestressed there. This yields a simple means of creating prestress.

In yet another embodiment, the at least one pad retaining spring comprises at least one central section, transitional sections, at least one pressure section and at least one bearing section.

Another embodiment provides that the at least one bearing section sits on the top side of the pad rear plate, and the at least one pressure section protrudes laterally from the pad rear plate on one end of the top side of the pad rear plate. This yields an advantageously compact design.

For an advantageously simple means of creating a tensile force, which acts on the brake pad, the at least one pressure section is supported on the at least one brake carrier horn of the pad slot of the brake carrier.

In another embodiment, the at least one retaining element is designed as a roller, in particular a cable roller. Such a roller design has the advantage of a lateral guidance of the pad retaining spring.

In a preferred embodiment, it is provided that the at least one pad retaining spring is produced from a spring wire. The pad retaining spring is therefore simple to manufacture.

Another preferred embodiment provides that such a pad retaining spring is arranged on each end of the top side of the pad rear plate. This yields an improved tensile force creation.

In one alternative embodiment, the at least one pad retaining spring is held and guided on the pad rear plate. This yields a simple mounting of the pad retaining spring on the pad rear plate.

In one embodiment, it is also provided that the least one pad retaining spring comprises a central section, arms and pressure sections, wherein the central section with a retaining section and connecting sections is in interaction with a fastening section of the pad rear plate, such that the fastening section forms, on the one hand, a fixation of the central section against lateral slipping of the central section and thus the pad retaining spring connected to it in the direction of a friction lining and, on the other hand, permits further fixation of the central section and thus of the pad retaining spring connected to it in the radial direction away from the top side of the pad rear plate, so that it points away from them. With the help of these fixations, it may be made possible for the pad retaining spring of the brake pad to be pulled radially upward and for lateral slipping to be preventable at the same time.

Therefore, the fastening section with a lug may form the additional fixation of the central section and thus of the pad retaining spring connected to it in the radial direction. This is a simple design without any additional components.

It may be provided here that the fastening section protrudes away from the top side of the pad rear plate, the lug being mounted on an upper edge of the fastening section and protruding as a protrusion toward an actuating side of the pad rear plate. This is also easily made possible without additional components.

It is advantageously simple if the lug is created by producing a contour, for example, by machining a contact surface beneath the lug on the fastening section.

In one embodiment, the central section of the pad retaining spring is in contact with the retaining surface along a side edge of the retaining section and along side edges of connecting sections, wherein the side edges and top sides of the connecting sections are in contact with the bottom and/or ends of the bottom side of the lug. An advantageously simple insertion of the pad retaining spring into the contour and/or beneath the lug is possible in this way.

If the pad retaining spring has at least one slot, through which a guide protrusion on the pad rear plate extends, then the pad retaining spring is advantageously additionally secured against twisting about a vertical axis as well as about its longitudinal axis.

In another embodiment, the pad retaining spring may have a recess and may thus have a reduction in its width between the slots, at least of the central section. This yields a compact design.

If the pressure sections protrude laterally away from the pad rear plate on each end of the top side of the pad rear plate, this yields, on the one hand, a compact design and, on the other hand, a simplified assembly.

It is advantageous here that at least one of the pressure sections is supported on the at least one brake carrier horn of the pad slot of the brake carrier, thus creating a tensile force, which acts on the brake pad.

In another alternative, it is provided that the at least one pad retaining spring is held in a form-fitting manner in the pad rear plate. This advantageously permits retention and introduction of a tensile force.

The at least one pad retaining spring here has a central section with a retaining section and two connecting sections, two arms and two pressure sections, wherein the retaining section is held in a form-fitting manner in a retaining opening in the pad rear plate and the two connecting sections are held in a slot in the pad rear plate. This is advantageous because no additional retainers are necessary, on the one hand, and, on the other hand, simple installation of the pad retaining spring by simple insertion is possible.

In one embodiment, the retaining section has a circular cross section with a central axis running parallel to an axis of rotation of the brake disc and designed like a pipe clamp with two connecting sections. This is simple to manufacture, for example, when the pad retaining spring is manufactured as a punched/bending part.

Another embodiment provides that the retaining opening is designed as a through-opening or as a blind hole with a circular cross section or with a different cross section, such as, for example, a triangular or polygonal cross section, wherein the retaining opening is connected to the top side through the slot and is at a distance from the top side of a fastening section in the radial direction. This yields a simple and compact design without any additional parts.

In another embodiment, the fastening section protrudes away from the top side of the pad rear plate and is divided by the slot into two subsections with the respective top side.

In this way the central section with the pad retaining spring is held easily and securely on the pad rear plate.

If the pad retaining spring has a constant width over the total length of the pad rear plate, wherein the pad retaining spring protrudes beyond the pad rear plate in the direction of a friction lining, then a simplified assembly is possible because the pressure sections of the pad retaining spring come in contact first with the brake carrier horn(s) due to the protrusion of the pad retaining spring when the brake pad is installed. Pressing on the brake pad then creates the prestress on the pad retaining spring, so that the brake pad is then displaced into the brake carrier.

If the pad retaining spring has at least one slot through which a guide protrusion on the pad rear plate extends, an advantageously simple guidance and fixation of the pad retaining spring on the pad rear plate are made possible.

If the pressure sections each protrude laterally away from the pad rear plate on one end of the top side of the pad rear plate, this also yields a compact design in this embodiment, on the one hand, and simplified assembly, on the other hand.

It is advantageous here that at least one of the pressure sections is supported on the at least one brake carrier horn of the pad slot of the brake carrier, thus creating a tensile force acting on the brake pad.

Yet another alternative embodiment provides that each spring retainer has a plate-shaped protrusion, which extends away from a top side of the pad rear plate and to which the at least one pad retaining spring is fastened. Weight can be saved in this way and a compact design is made possible.

In one embodiment, the at least one pad retaining spring is designed in the form of a hood, which results in easy assembly.

In this regard, the at least one pad retaining spring has a base plate, two fastening straps and a spring arm, each with a pressure section, so that the at least one pad retaining spring is mounted with the fastening straps on the respective protrusion. The pad retaining spring may advantageously be produced easily as a punched/bending part.

It is advantageous if the at least one pad retaining spring is mounted in a form-fitting manner on the respective protrusion because simple assembly and positioning on the protrusion are possible in this way.

If the at least one pad retaining spring is mounted securely and in a form-fitting manner on the respective protrusion, this yields the advantage of a safety against loss. Such a form-fitting and secure mounting can be established by riveting, bolting and the like, for example.

In another embodiment, the spring arm of the at least one pad retaining spring is fastened to the base plate by a curved connecting section. This yields the advantage of creating an additional spring force.

In addition, the curved connecting section can communicate with the shape of a contact surface of the protrusion, so that an advantageous and compact support of the connecting section in the uninstalled state of the brake pad is possible.

In yet another embodiment variant, the at least one pad retaining spring may have at least one supporting section, which is mounted on the base plate opposite the spring arm and has on its bottom side at least one supporting section, which is supported on the top side of the pad rear plate. This makes it possible to prevent a rotational movement of the pad retaining spring about its mount on the protrusion.

In yet another embodiment, the at least one pad retaining spring may be provided with at least one slot. This yields the advantage that the different spring forces required for different application cases can be obtained. This may also take place due to the fact that the at least one pad retaining spring is provided with at least one reinforcing bead and/or at least one reinforcing rib. The reinforcing bead and/or reinforcing rib may be used alone or in combination with the at least one slot.

The at least one pressure section protrudes laterally away from the pad rear plate at one end of the top side of the pad rear plate and thus permits a compact design.

It is advantageous here that the at least one pressure section is supported on the at least one brake carrier horn of the pad slot of the brake carrier, thereby creating a tensile force acting on the brake pad.

In a preferred embodiment, it is provided that at least one pad retaining spring is arranged on each end of the top side of the pad rear plate.

A brake pad set for a disc brake described above for a vehicle, in particular for a commercial vehicle, includes at least one brake pad on the clamping side and at least one brake pad on the rear end. The brake pad on the clamping side has at least one pad retaining spring with at least one pressure section, wherein the at least one pressure section protrudes laterally beneath one end of the top side of a pad rear plate of the brake pad on the clamping side.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 15 shows a schematic perspective view of a pad retaining spring of the third embodiment according to FIGS. 12-13;

FIG. 16 shows a schematic perspective view of a fastening element of the pad retaining spring of the brake pad of the embodiment according to FIGS. 12-13;

FIG. 19 shows a schematic perspective view of a pad rear plate of a brake pad of the fourth embodiment according to FIGS. 17-18;

FIG. 20 shows a schematic perspective view of a pad retaining spring of the embodiment according to FIGS. 17-18;

FIG. 37 shows a schematic view of a brake pad according to another variant of the seventh embodiment of the disc brake shown in FIG. 29, and FIGS. 38-39 show schematic perspective views of pad retaining springs of the additional variant of the exemplary embodiment shown in FIG. 37.

DETAILED DESCRIPTION

Terms such as "above," "below," "right," "left," etc. relate to directions and arrangements in the figures.

Figure 1:
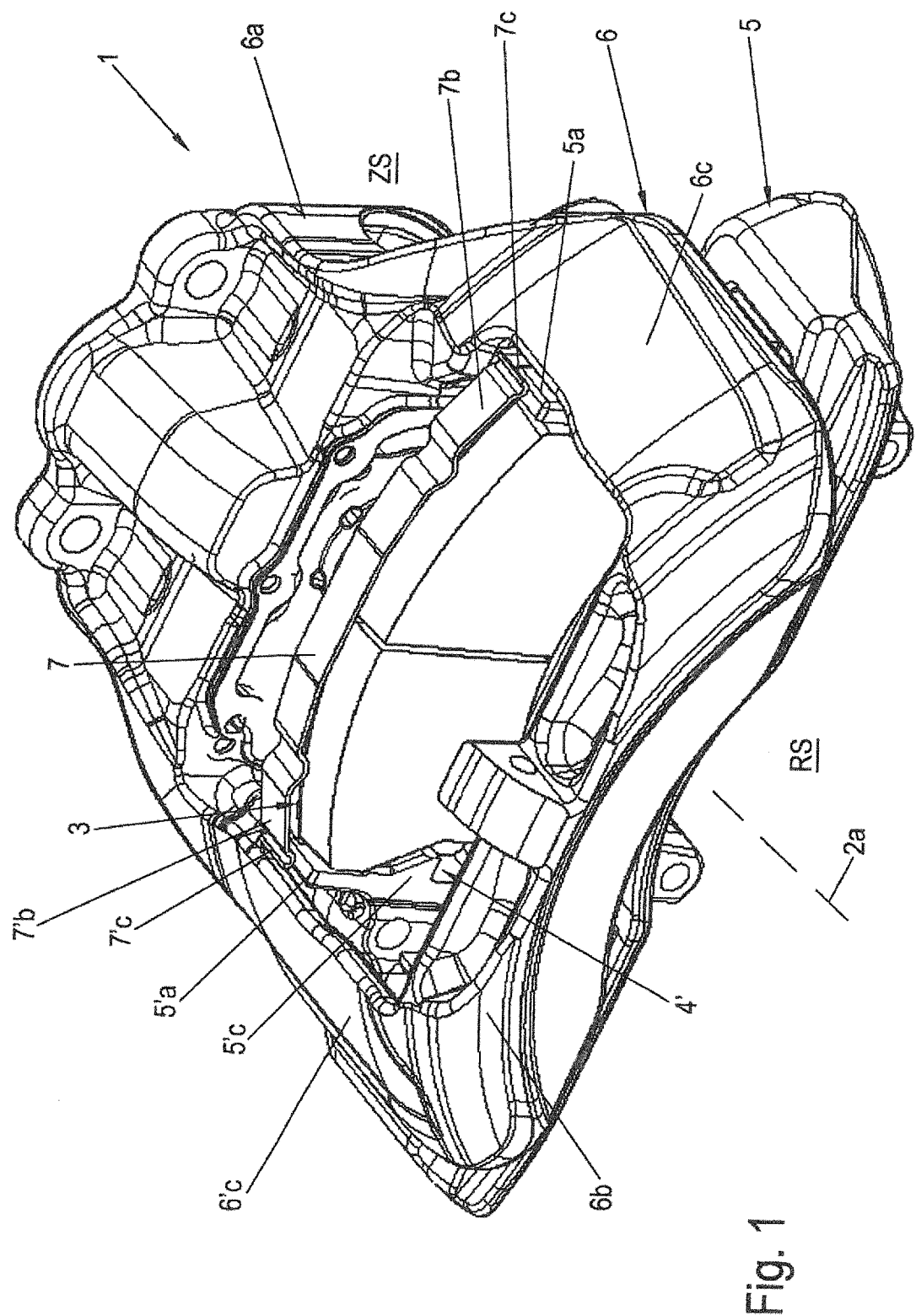
FIG. 1 shows a schematic perspective view of a first embodiment of a disc brake according to the invention.
Figure 2:
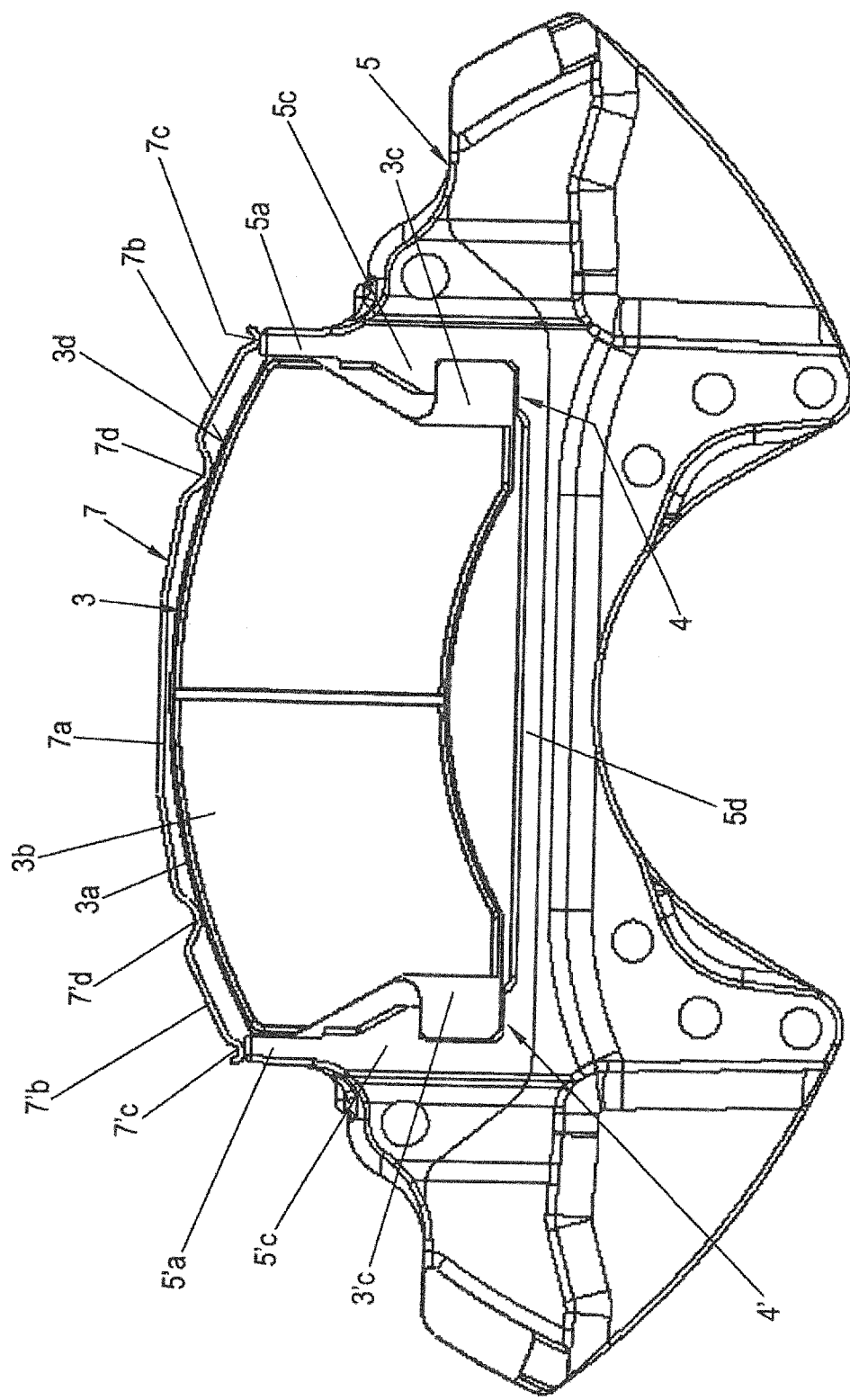
FIGS. 2-4 show schematic partial views of a brake carrier and brake pad of the disc brake shown in FIG. 1.
Figure 3:
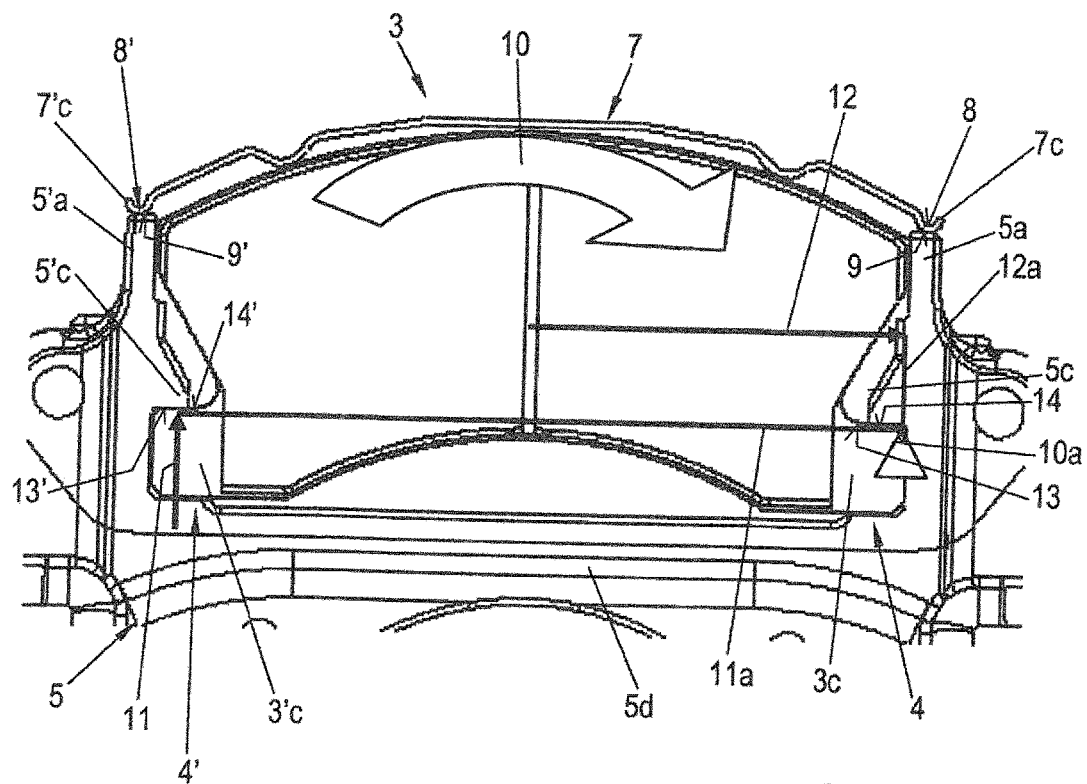
Figure 4:
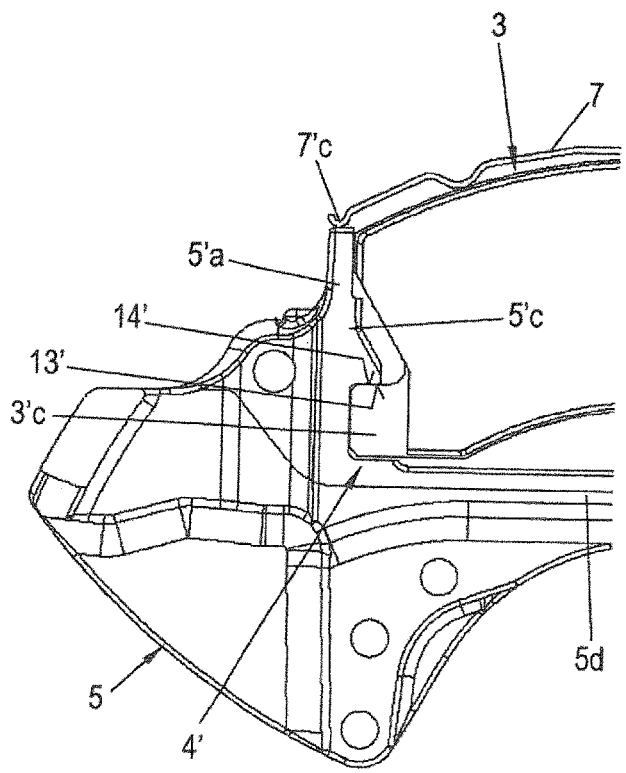

FIG. 1 shows a schematic perspective view of the first embodiment of a disc brake 1 according to the invention, for example, a pneumatic disc brake 1. Schematic partial views of a brake carrier 5 of the disc brake 1 according to the invention, as shown in FIG. 1, can be seen in FIGS. 2 through 4 with a brake pad 3 according to the invention. FIG. 1 does not show a brake disc 2 for the sake of simplicity, but it can be imagined easily by reference to FIG. 9. FIG. 2 shows a top view of a friction lining 3b of the brake pad 3 in a brake carrier 5. FIG. 3 shows forces 11, 12 acting on brake pad 3. FIG. 4 shows an enlarged diagram of one side of the brake pad 3 engaged with a brake carrier horn 5'a.

The disc brake 1 is part of the brake system of a vehicle, for example, in particular a commercial vehicle, and comprises the brake disc 2 with an axis of rotation 2a of the brake disc and two brake pads 3 arranged on both sides of the brake disc 2. Of the two brake pads 3, only one so-called clamping-side brake pad 3 is shown. The other brake pad is easy to imagine. In addition, the disc brake 1 includes the brake carrier 5, a brake caliper 6 and a clamping device (not shown).

The brake pad has a pad rear plate 3a to which the friction lining 3b is attached. The brake pads 3 are each held in a pad slot 15, 16 (see also FIGS. 5, 6) between two brake carrier horns 5a, 5'a; 5b, 5'b in the brake carrier 5 and are retained in the brake carrier 5. A pad retaining bracket (not shown) serves to retain the brake pads 3. At least the brake pad 3 is guided displaceably in the respective pad slot 15 in the direction of the axis of rotation 2a of the brake disc. It is assumed here that, while the respective vehicle is traveling in a forward direction, the brake disc 2 rotates in a main direction of rotation 10 (FIG. 3) about the axis of rotation 2a of its brake disc in forward travel of the vehicle. Thus the side of the brake caliper 6 situated on the left in FIG. 1 is designated as the intake side and the side of the brake caliper 6 on the right is designated as the outlet side. Accordingly, the brake carrier horns 5'a, 5'b are designed as brake carrier horns 5'a, 5'b on the intake side and the brake carrier horns 5a, 5b on the opposite side are designated as brake carrier horns 5a, 5b on the outlet side. Unless otherwise indicated, components and modules, which are assigned to the inlet side below, are characterized with an apostrophe after the respective reference numeral.

The brake caliper 6 here is designed as a sliding caliper and has a clamping section 6a and a rear section 6b, which are connected to one another on each end by means of connecting sections 6c, 6'c in the direction of the axis of rotation 2a of the brake disc. The clamping section 6a and the rear section 6b are each arranged on one side of the brake disc 2 and parallel to it, wherein the connecting sections 6c extend parallel to the axis of rotation 2a of the brake disc in the y direction. The clamping section 6a and the rear section 6b together with the connecting sections 6c form an opening over the brake disc 2 with the brake pads 3 for accessing these for mounting, replacement and maintenance and repair work.

The clamping section 6a of the brake caliper 6 receives the clamping device of the disc brake 1. The clamping device serves to actuate the disc brake 1 and may have a brake rotary lever with a compressed air cylinder, for example. This will not be described further here.

The side of the disc brake 1, on which the clamping section 6a of the brake caliper 6 with the clamping device is arranged, is designated below as the clamping side ZS. The other side of the disc brake 1 on which the rear section 6b of the brake caliper 6 is arranged is designated as the rear side RS, also referred to as the reaction side. These terms "clamping side" and "rear side" and additional designations referring to them are customary and are used for better orientation.

Thus the brake pad 3 with the pad rear plate 3a, which is located on the clamping side ZS, is designated as the brake pad 3 on the clamping side, and the brake pad opposite it is referred to as the brake pad on the rear side accordingly.

The brake pad 3 on the clamping side is acted upon by the clamping device in braking operations with a clamping force in the direction of the axis of rotation 2a of the brake disc. The rear side brake pad, which is not shown here but is easy to imagine, is accommodated in the rear section 6b of the brake caliper 6 and has relative movements to the rear section 6b in this disc brake 1 with the brake caliper 6 in the sliding caliper embodiment.

The brake pad 3 on the clamping side is provided with a pad retaining spring 7 on a top side 3d of the pad rear plate 3a. The pad retaining spring 7 (FIG. 2) comprises a central section 7a, arms 7b, 7'b, pressure sections 7c, 7'c and transitional sections 7d, 7'd.

The central section 7a is fastened to the top side 3d of the pad rear plate 3a approximately at the center of the top side 3d and extends toward both sides in the longitudinal direction of the pad rear plate 3d (i.e., in parallel to the brake disc 2 in the installed state of the brake pad 3) each for a length corresponding approximately to one-fourth of the length of the pad rear plate 3d in the longitudinal direction. The central section 7a can be fastened, for example, by welding, riveting, screwing and the like.

A transitional section 7d, 7'd is mounted on each end of the central section 7a, by means of which one arm 7b, 7'b is connected to the central section 7a. The transitional sections 7d, 7'd are each designed with a curved shape, wherein they have a convex curvature toward the top side 3d of the pad rear plate 3a. In this way, the transitional sections 7d, 7'd are each in linear contact with the top side 3d of the pad rear plate 3a. The linear contact runs parallel to the axis of rotation 2a of the brake disc in the installed state of the brake pad 3 in this example. Other forms of contact are naturally also possible, for example, single-point contact, multipoint contact, multiline contact, etc.

The convex transitional sections 7d, 7'd span the central section 7a, so that they are pressed onto the top side 3d by means of the spring force of the central section 7a.

Each transitional section 7d, 7'd develops into a respective arm 7b, 7'b. Each arm 7b, 7'b extends up to the respective end of the top side 3d of the pad rear plate 3a and is in contact with this in its respective end when the brake pad 3 is not installed.

A pressure section 7c, 7'c which is mounted on each free end of an arm 7b, 7'b and protrudes beyond the respective end of the top side 3d in the longitudinal direction of the pad rear plate 3a, is pressed by the spring force of the central section 7a, of the transitional sections 7d, 7'd and of the arms 7b, 7'b onto the top side 3d of the pad rear plate 3a.

Each pressure section 7c, 7'c is designed with a convex curvature, so that its convex side faces downward toward the pad rear plate 3a. The curvature of the pressure sections 7c, 7'c is smaller than the curvature of the transitional sections 7d, 7'd.

The width of the pad retaining spring 7 is constant in this example and corresponds here approximately to the thickness of the pad rear plate 3a. The width and thickness run in the direction of the axis of rotation 2a of the brake disc. The width of the pad retaining spring 7a may of course also be different with respect to the pad rear plate 3a and/or may not run consistently.

The pad slot 15 on the clamping side is bordered by the brake carrier horns 5a, 5'a on both sides and is closed by a strut 5d on its lower side. Each brake carrier horn 5a, 5'a has a lug 5c, 5'c with rounded corners protruding inward into the pad slot 15 approximately at its center in a direction perpendicular to the axis of rotation 2a of the brake disc. Beneath each lug 5c, 5'c there is an undercut 4, 4', which is shaped outward, i.e., extending away from the pad slot 15 in a plane parallel to the brake disc 2 and into the respective brake carrier horn 5a, 5'a and forming a contour with the lug 5c, 5'c. Each undercut 4, 4' runs beneath each lug 5c, 5'c, first running parallel to the strut 5d into the respective brake carrier horn 5a, 5'a. Then this respective contour runs at a right angle in the brake carrier horn 5a, 5'a, running downward to a support, which extends in turn at a right angle to the inside of the pad slot 15 over a distance corresponding approximately to the length of the undercut 4, 4' beneath each lug 5c, 5'c. These supports are connected by the struts 5d, wherein a top side of the strut 5d is arranged deeper, i.e., further toward the axis of rotation 2a of the brake disc, than the surfaces of the supports.

Each side of the pad rear plate 3a on the clamping side cooperating with the respective brake carrier horn 5a, 5'a also has a contour, which corresponds to the respective contour of the respective brake carrier horn 5a, 5'a. In other words, the shape of each lug 5c, 5'c is molded into the respective side of the pad rear plate 3a with a rectangular protrusion 3c, 3'c of the pad rear plate 3a being formed, corresponding to the respective undercut 4, 4' of a brake carrier horn 5a, 5'a. In this way, the brake pad 3 on the clamping side with its pad rear plate 3a is held in the pad slot 15 on the clamping side in the contours with the lug 5c, 5'c and with the undercut 4, 4' in a form-fitting manner such that the brake pad 3 on the clamping side is guided displaceably in the direction of the axis of rotation 2a of the brake disc but is secured in a direction perpendicular to the axis of rotation 2a of the brake disc. Then only the end regions of the bottom side of the pad rear plate 3a on the clamping side rest on the respective supports at the ends of the struts 5d.

Figure 5:
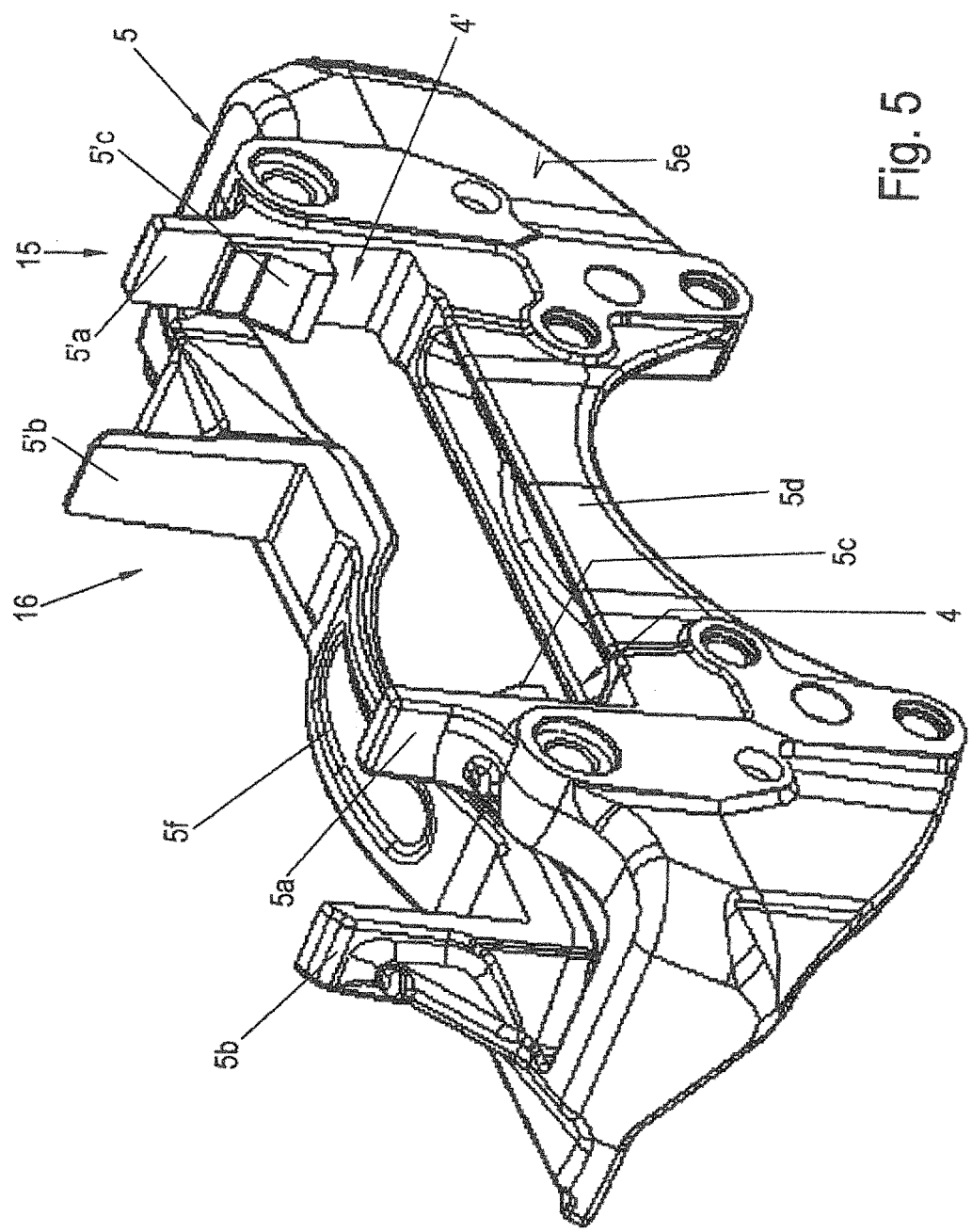
FIGS. 5-7 show schematic views of the brake carrier of the disc brake shown in FIG. 1.
Figure 6:
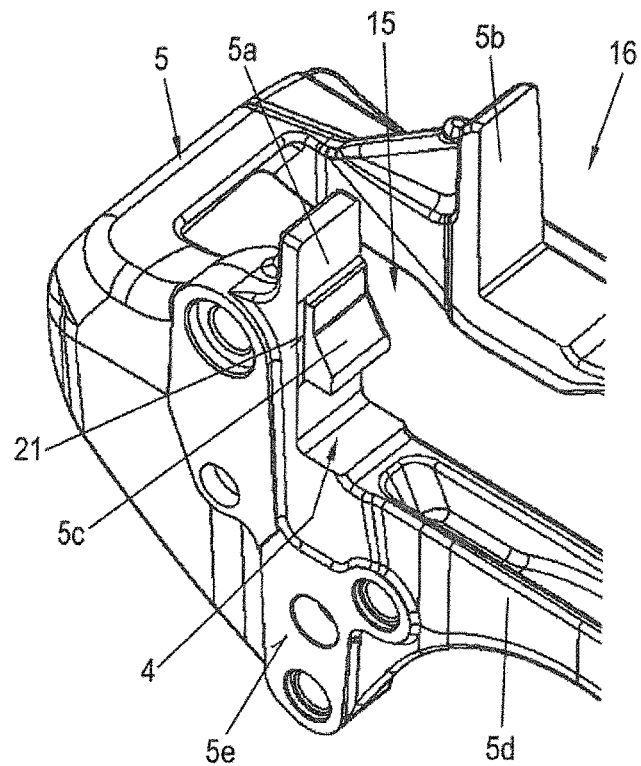

In FIG. 2 the brake pad 3 has been inserted into the pad slot 15 of the brake carrier 5. This takes place first through radial insertion of the brake pad 3 into the interspace between the pad slots 15, 16 (FIGS. 5, 6).

The pad retaining spring 7 is supported during assembly first on a brake carrier horn 5a, 5'a on one side, so that the brake pad 3 can thereby be forced into one of the undercuts 4, 4' of the brake carrier 5. Next the brake pad 3 is secured in the pad slot 15 of the brake carrier 5 and can be shifted into its working position by means of the brake caliper 6 in the axial direction, i.e., in the direction of the axis of rotation 2a of the brake disc.

The contours of the sides of the pad rear plate 3a of the brake pad 3 come into engagement with the contours of the lugs 5c, 5'c and of the undercuts 4, 4' in this way and form a form-fitting contact. The convex sides of the pressure sections 7c, 7'c of the pad retaining spring 7 are then each in contact along their contact sections 9, 9' for resting on the support sections 8, 8' (FIG. 3) on the top sides of the brake carrier horns 5a, 5'. In doing so, the pad retaining spring 7 is supported here on the brake carrier horns 5a, 5'a on the clamping side and is stressed in the upper direction against the spring force of the pad retaining spring 7.

The pad retaining spring 7, which is stressed on both ends in this way, exerts a tensile force outward in the radial direction away from the axis of rotation 2a of the brake disc. This results in contact of the brake pad 3 with the undercuts 14, 14' of its protrusions 3c, 3'c on the undercut surfaces 13, 13' on the bottom sides of the lugs 5c, 5'c of the brake carrier horns 5a, 5'a with no play.

To reduce tangential wear (over the longitudinal side, i.e., the long side of the brake pad 3), in particular in single-stamp embodiments of the disc brake 1, a frictional force 11 is created on the undercut surface 13', 14' on the intake side by means of lever kinematics. This generates a torque around a pivot point 10a with a lever arm 11a. The pivot point 10a here is at a point of contact between an upper corner edge of the protrusion 3a on the outlet side and a lower corner edge of the lug 5c of the brake carrier horn 5a on the outlet side between the undercut surfaces 13 and 14.

This torque acts against an intake torque (force 12 with a lever arm 12a—a known effect, which causes greater wear on the intake side of the friction lining 3b due to the pad rear plate 3a of the brake pad 3 being supported on the brake carrier horn 5a on the outlet side) and thus compensates for a portion of the (tangential) pad wear.

For optimal utilization of this effect, the undercut surfaces 13, 14, 13', 14' are designed so that, in the installed state of the brake pad 3, they are engaged with no play.

Figure 7:
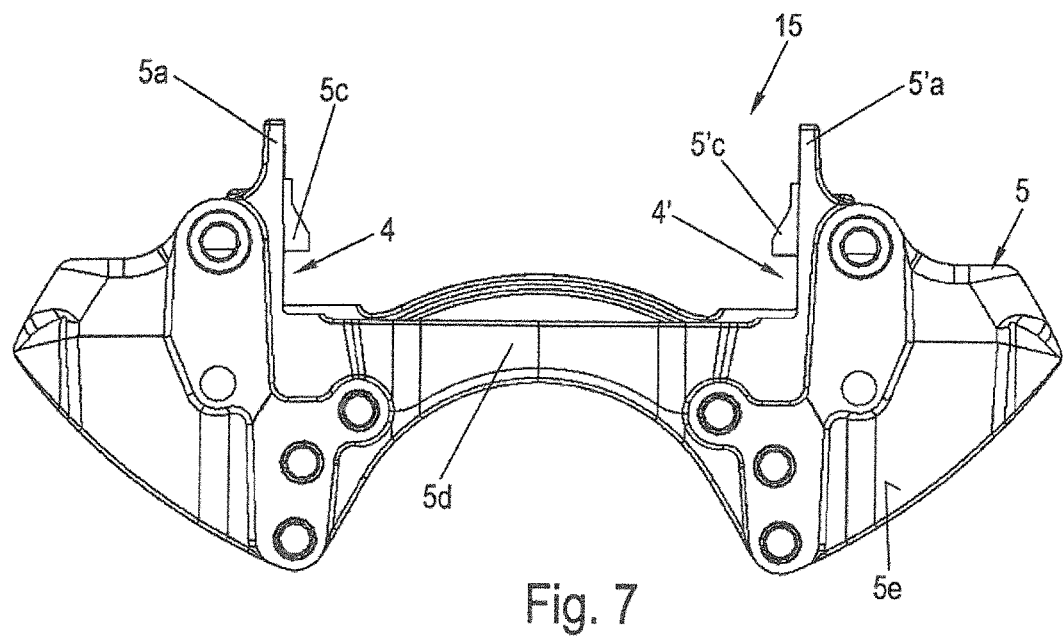

FIGS. 5 through 7 show schematic views of the brake carrier 5 according to FIGS. 2 through 4 of the disc brake 1 according to the invention, as shown in FIG. 1.

FIG. 5 shows a perspective view of the brake carrier 5, as seen from the clamping side ZS (FIG. 1) with a view of the fastening side 5e of the brake carrier 5. The pad slot 15 on the clamping side with the brake carrier horns 5a, 5'a and the lugs 5c, 5'c protruding into the pad slot 15 can be seen clearly. The rear pad slot 16 has brake carrier horns 5b, 5'b without lugs, connected by a strut 5f in parallel with the strut 5d.

FIG. 6 shows the undercut 4 on the outlet side in an enlarged perspective view.

FIG. 7 shows a top view of the fastening side 5e of the brake carrier 5. The brake carrier 5 is mounted with its fastening side 5e on stationary fastening sections of the vehicle provided for this purpose.

Figure 8:
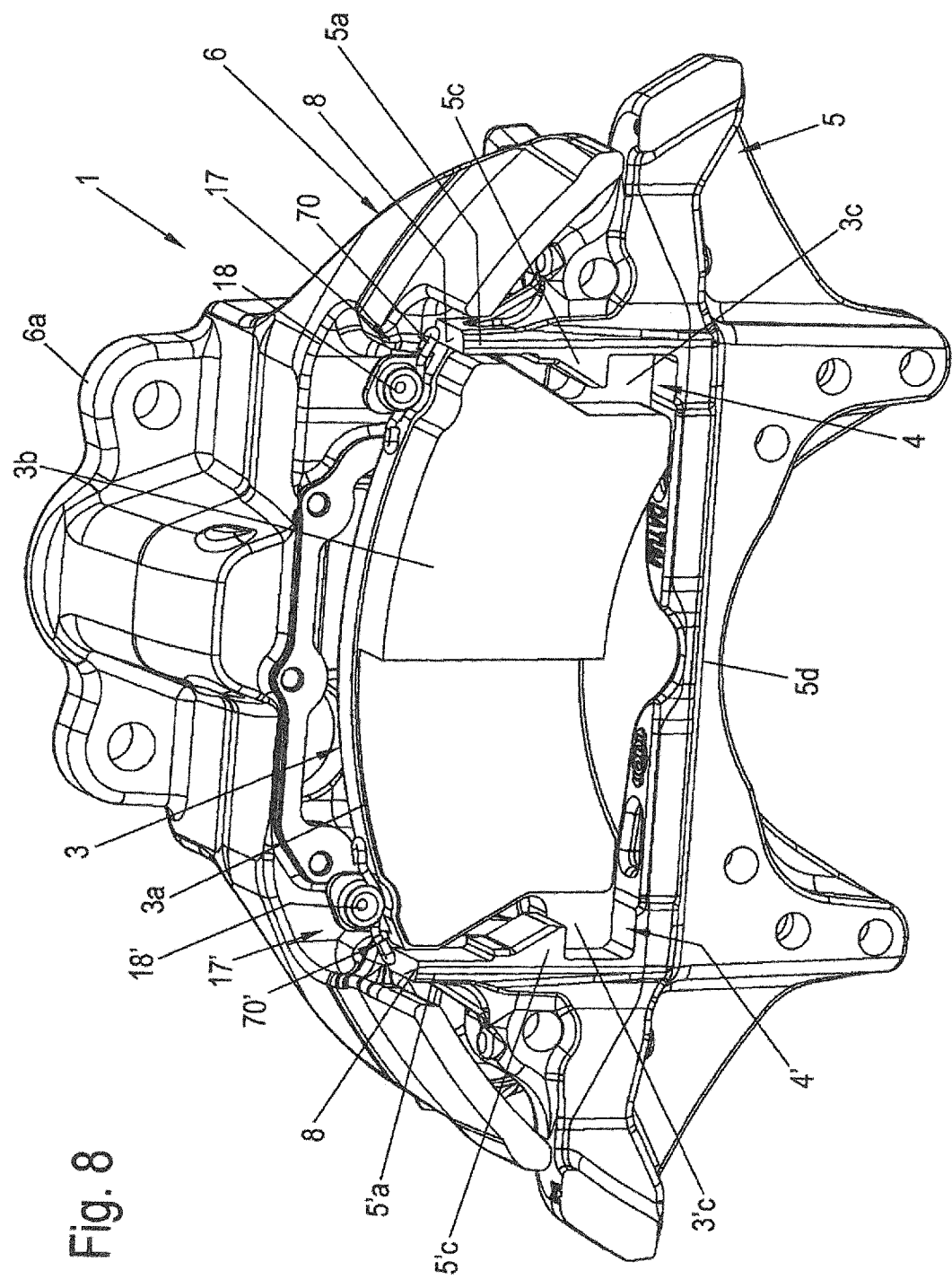
FIGS. 8-9 show schematic views of a second embodiment of the disc brake according to the invention.
Figure 9:
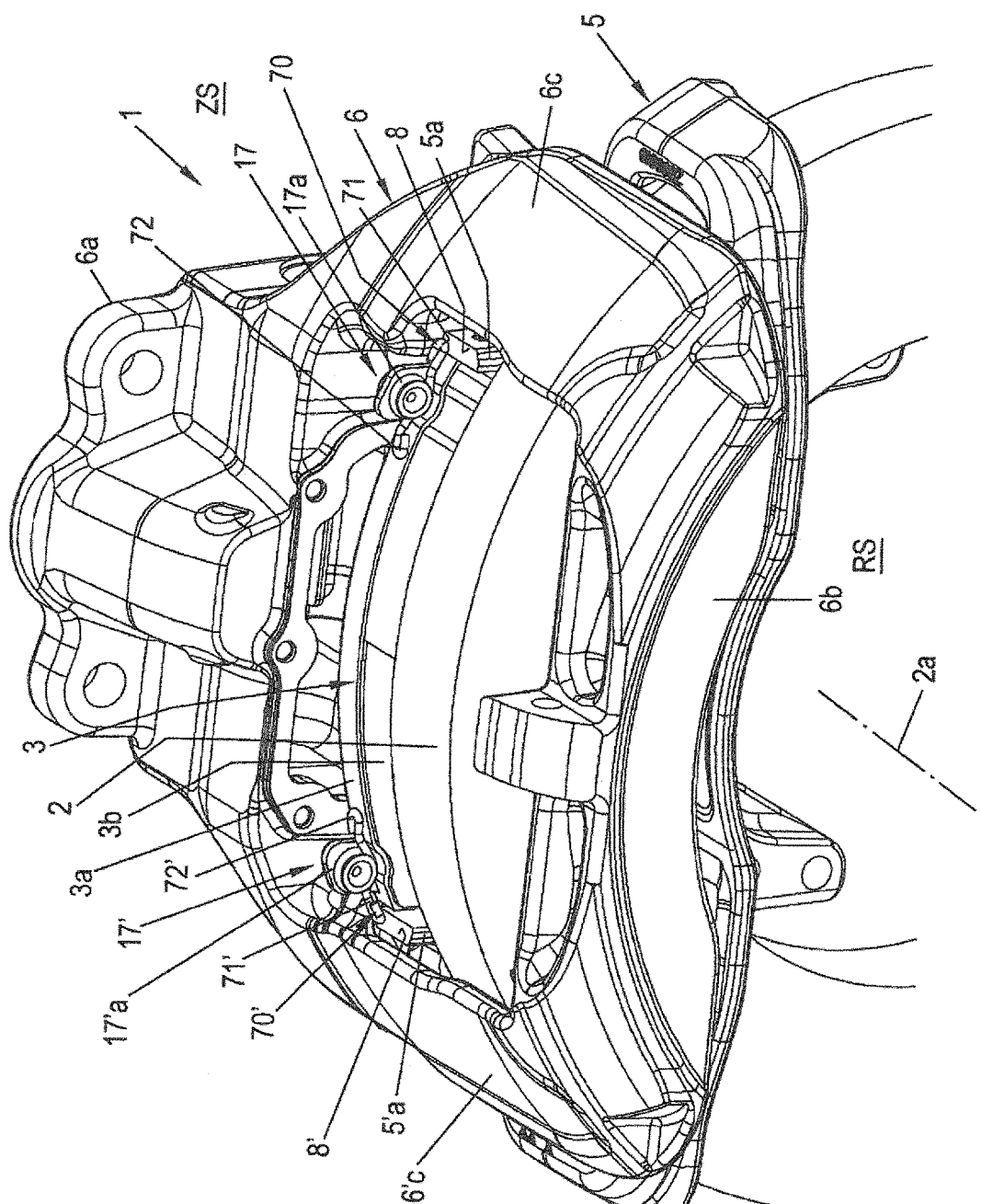
Figure 10:
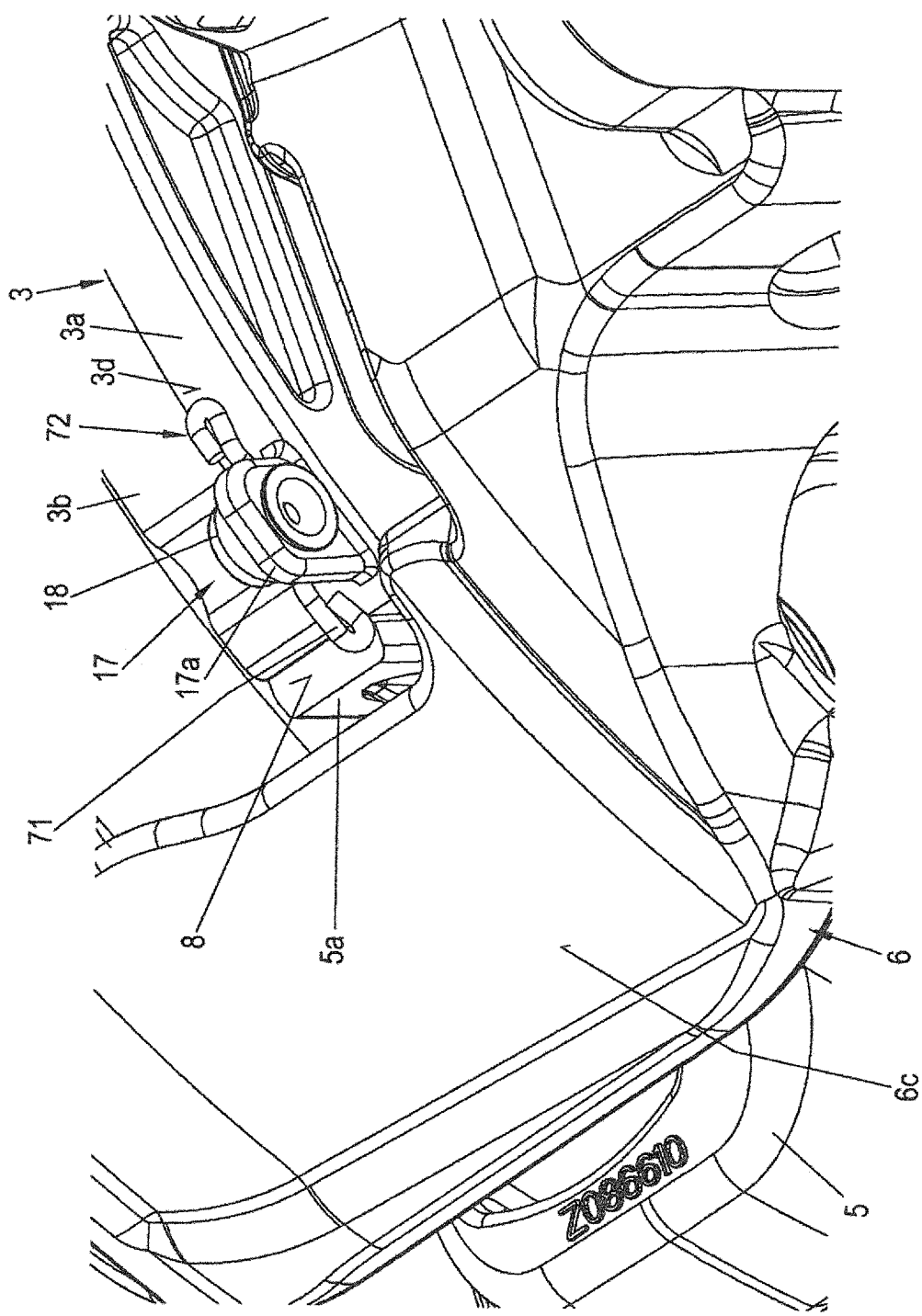
FIGS. 10-11 show schematic enlarged partial views of the second embodiment shown in FIGS. 8-9.
Figure 11:
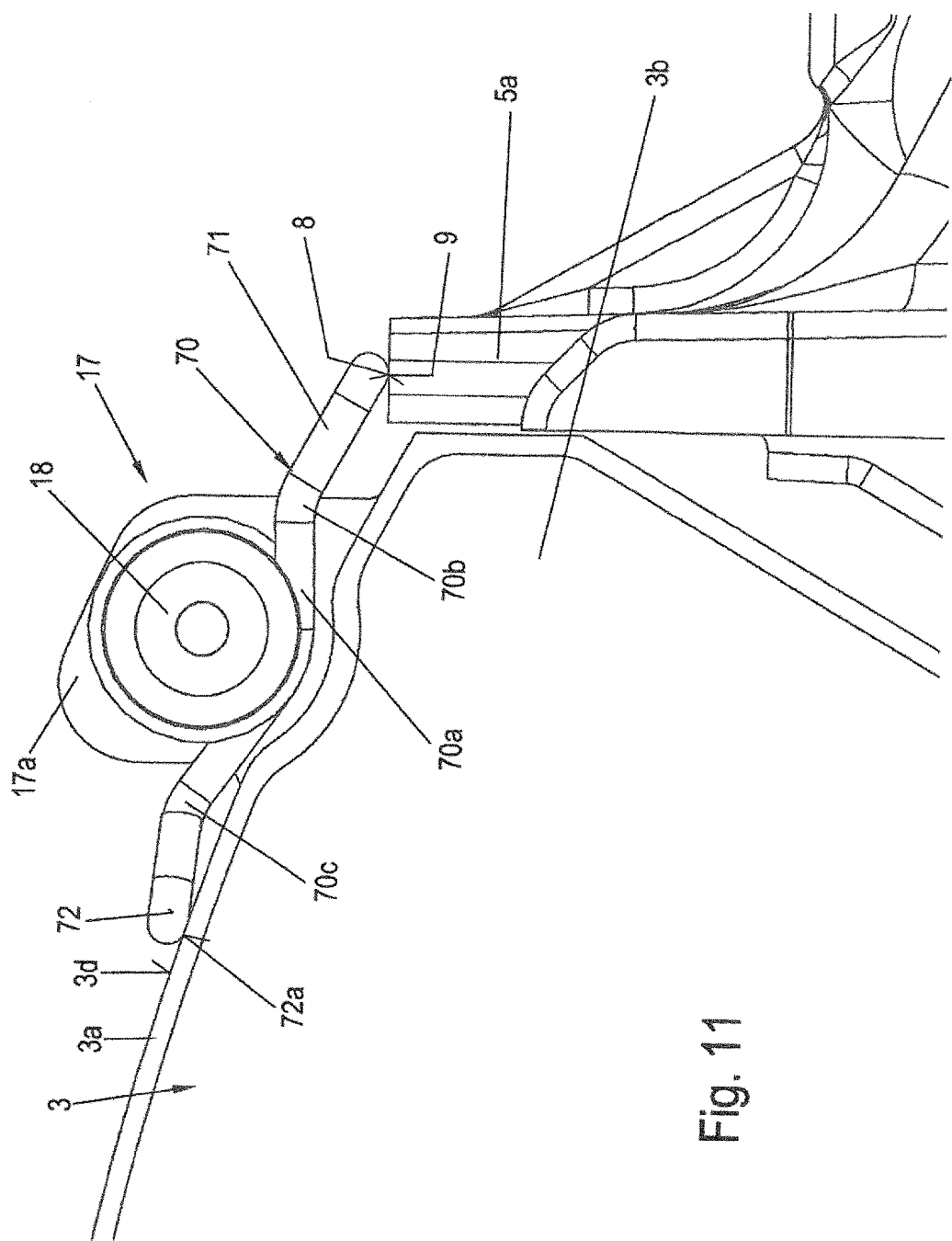

FIGS. 8 and 9 show schematic views of a second embodiment of the disc brake 1 according to the invention, wherein FIG. 8 shows a partial sectional view, in which the section runs through the brake carrier 5 in a plane parallel to the brake disc plane. FIG. 9 shows a perspective view of the second embodiment of the disc brake 1. FIGS. 10 and 11 show schematic enlarged partial views of the second embodiment of the disc brake 1 according the invention, as shown in FIGS. 8 through 9.

In this second embodiment, the components of the disc brake 1 are the same as those in the first embodiment, except for the brake pad 3. Therefore, only the differences in the brake pad 3 are discussed in the remaining text.

The brake pad 3 on the clamping side also has a pad rear plate 3a with a friction lining 3b in this embodiment. The pad rear plate 3a is provided with contours, which correspond to the contours of the lugs 5c, 5'c and the undercuts 4, 4'. This was already described above in conjunction with the first embodiment.

The pad rear plate 3a is designed in its side regions on the top side 3d with a spring retainer 17, 17' for each of at least one pad retaining spring 70, 70'. Each spring retainer 17, 17' includes a protrusion 17a, 17'a which protrudes upward away from the pad rear plate 3a. Each protrusion 17a, 17'a is plate-shaped and protrudes upward with approximately twice the thickness of the pad rear plate 3a. An extension of each protrusion 17a, 17'a in the longitudinal direction of the pad rear plate 3a also corresponds approximately to a double thickness of the pad rear plate 3a. Each protrusion 17a, 17'a is arranged with an offset toward the center at a distance from each side of the pad rear plate 3a in its longitudinal direction, wherein this distance corresponds approximately to the thickness of the pad rear plate 3a.

The rear surface of each protrusion 17a, 17'a facing the clamping side ZS is flush with the rear surface of the pad rear plate 3a facing the clamping side ZS.

A retaining element 18, 18' is mounted at the center of the side facing toward the friction lining 3b of each protrusion 17a, 17'a. In this embodiment, this retaining element 18, 18' is a roller mounted fixedly or so that it can rotate about an axis running parallel to the brake disc axis 2a. This roller may be designed as a cable roller, for example. The top side 3d of the pad rear plate 3a is provided with an arc-shaped recess in the region beneath each retaining element 18, 18', this recess corresponding to the diameter of the roller of the retaining element 18, 18' and each retaining element 18, 18' being arranged at a distance from this recess.

A pad retaining spring 70, 70' is arranged between each retaining element 18, 18' and the top side 3d of the pad rear plate 3a and is prestressed due to its shape and the arrangement between each retaining element 18, 18' and the respective recess of the top side 3d. This prestress causes each pad retaining spring 70, 70' to be in contact with the top side 3d of the pad rear plate 3a at one end, wherein the other end protrudes beyond the respective end of the top side 3d in the longitudinal direction of the pad rear plate 3a and rests on this end of the top side 3d in the uninstalled state of the brake pad 3 in a prestressed form.

Each pad retaining spring 70, 70' comprises a central section 70a, transitional sections 70b and 70c, at least one pressure section 71, 71' and at least one bearing section 72, 72'.

The pad retaining spring 70 on the outlet side is described below. The design of the pad retaining spring 70' on the inlet side is embodied in mirror image.

A transitional section 70b, 70c is mounted on each end of the central section 70a. The transitional section 70b faces one end of the top side 3d of the pad rear plate 3a and connects the central section 70a to the pressure section 71. The transitional section 70c is mounted on the other side of the central section 70a, faces the center of the top side 3d and connects the central section 70a to the bearing section 72. Each transitional section 70b, 70c is shaped with respect to the top side 3d so that it curves toward it.

The pressure section 71 has a contact section 9 on the bottom side of its free end, resting on the supporting section 8 of the brake carrier horn 5a in the installed state of the brake pad 3. When the brake pad 3 is not installed, the pressure section 71 rests on one end of the top side 3d of the pad rear plate 3a.

On the bottom side of its free end, the bearing section 72 has a supporting section 72a, which is constantly in contact with the top side 3d of the pad rear plate 3a.

The central section 70a is arranged between the retaining element 18 and the recess in the top side 3d of the pad rear plate 3a beneath it, wherein the central section 70a does not come in contact with the top side 3d. This is made possible by the recess as well as by the design of the retaining element 18 as a cable roller.

The transitional sections 70b, 70c span the central section 70a, so that the pressure section 71 is pressed by the spring force of the central section 7a, either onto the end of the top side 3d or onto the brake carrier horn 5a. At the same time, the central section 70a, which is spanned in this way, causes the bearing section 72 to also be pressed against the top side 3d.

The pad retaining springs 70, 70' in this example are made of a spring wire material. The ends here are curved accordingly to form the pressure section 71, 71' and the bearing section 72, 72'. This yields spot-shaped and arc-shaped contact sections in interaction with the respective supporting surfaces.

The brake pad 3 is assembled as described for the first embodiment.

Figure 12:
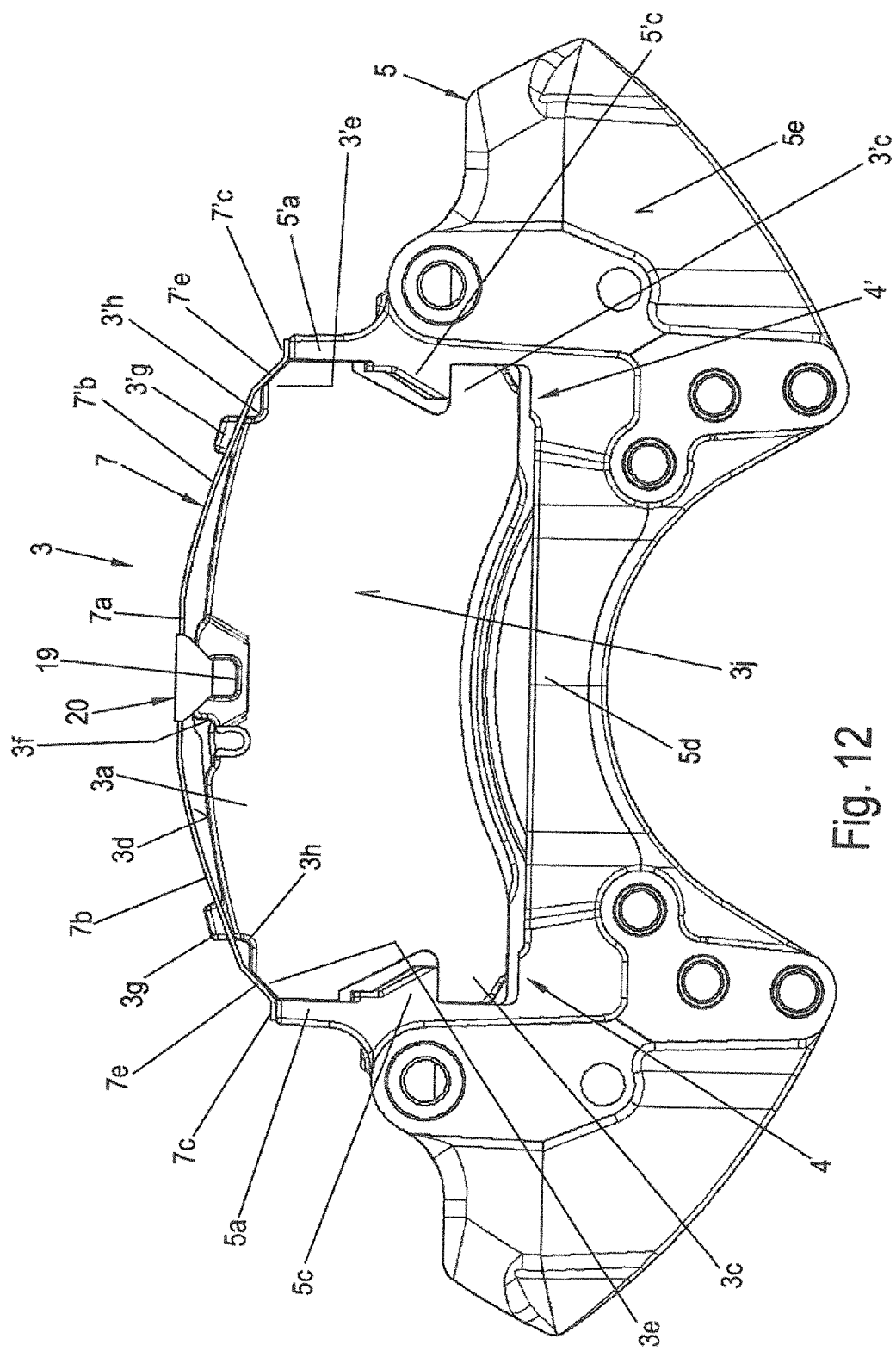
FIGS. 12-13 show schematic partial views of a third embodiment of the disc brake according to the invention.
Figure 13:
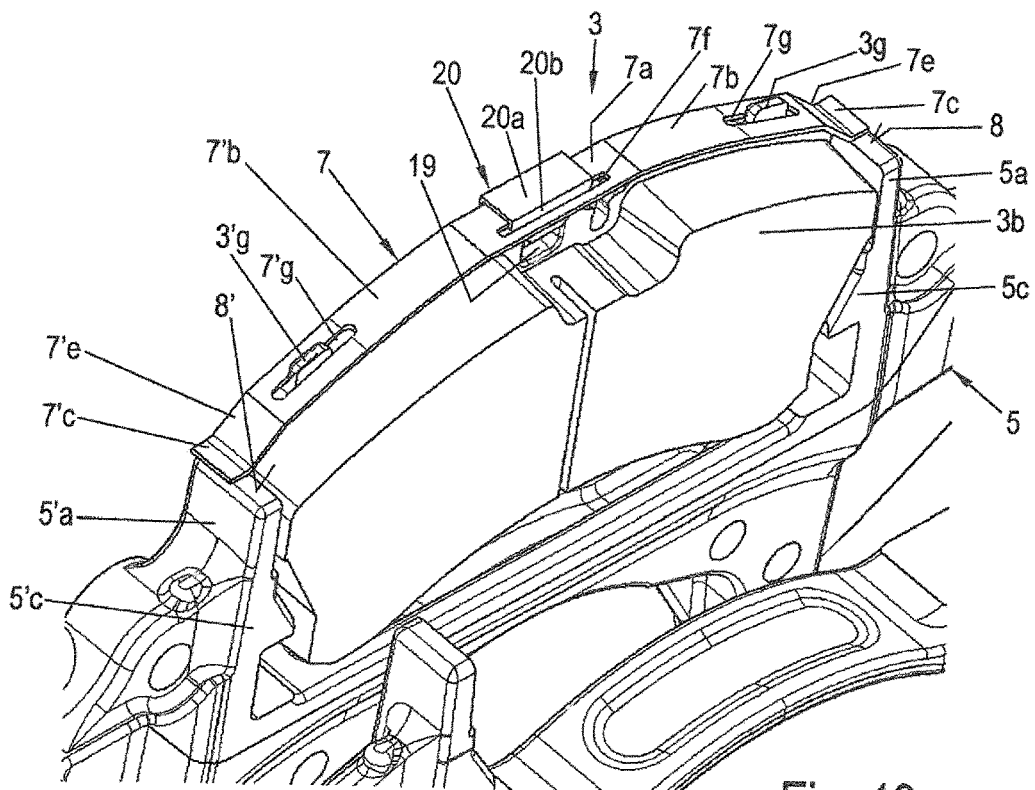
Figure 14:
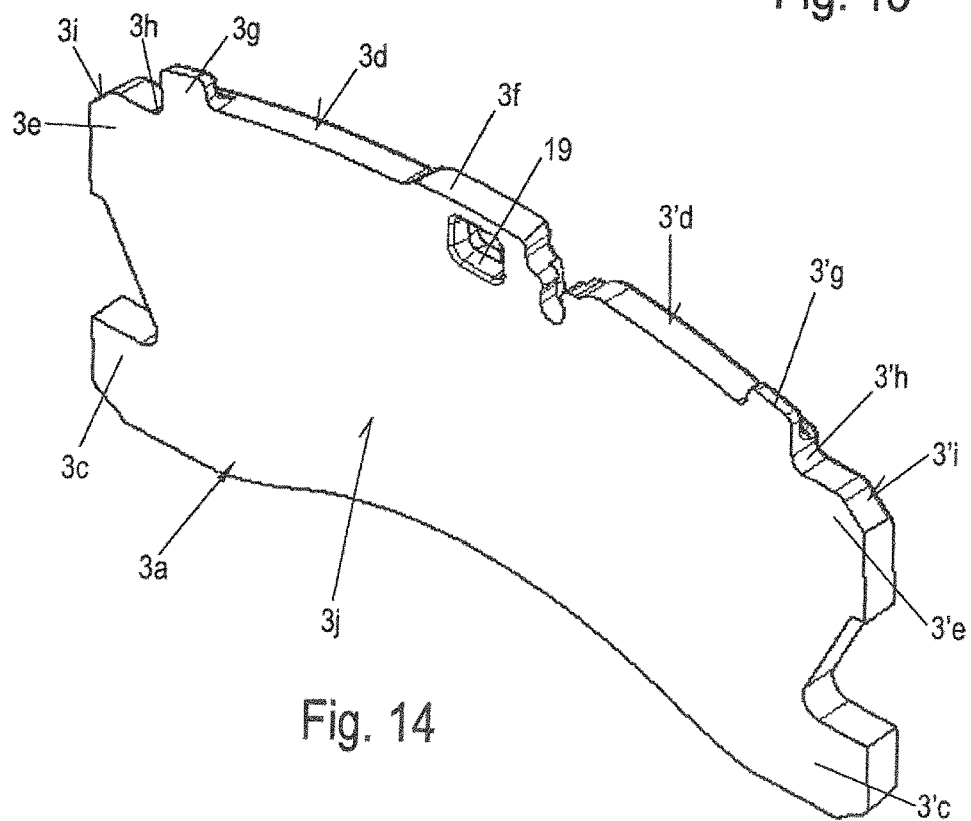
FIG. 14 shows a schematic perspective view of a pad rear plate of a brake pad of the third embodiment according to FIGS. 12-13.

FIGS. 12-13 show schematic partial views of a third embodiment of the disc brake 1 according to the invention, wherein FIG. 12 shows a view of the actuating side 3j of the pad rear plate 3 from the clamping side ZS (FIG. 1). FIG. 13 shows a view from the brake disc 2. FIG. 14 shows a schematic perspective view of a pad rear plate 3a of a brake plate 3 of the third embodiment according to FIGS. 12-13 on the actuating side 3j. FIG. 15 shows a schematic perspective view of a pad retaining spring 7 of the exemplary embodiment according to FIGS. 12-13. FIG. 16 shows a schematic perspective view of a fastening element 20 of the pad retaining spring 7 according to FIG. 15 of the brake pad 3 of the embodiment according to FIGS. 12-13.

In this third embodiment, the components of the disc brake 1 are the same as those in the first embodiment, except for the brake pad 3. Therefore, only the differences in the brake pad 3 are discussed in the further discussion.

The brake pad 3 on the clamping side also has a pad rear plate 3a with a friction lining 3b in this embodiment. The pad rear plate 3a is provided with the contours already described above, corresponding to contours of the lugs 5c, 5'c and undercuts 4, 4'.

In contrast with the first embodiment, the pad retaining spring 7 is fastened to a fastening section 3f through a fastening element 20 at its center. The fastening element 20 is described in greater detail below.

In this third embodiment, the pad retaining spring 7 comprises a central section 7a, arms 7b, 7'b, pressure sections 7c, 7'c and intermediate sections 7e, 7'e.

The central section 7a is provided with a slot 7f running in the longitudinal direction of the pad retaining spring 7 to receive a section of a fastening element 20. The slot 7f does not run in an imaginary central line of the pad retaining spring 7 but instead runs with an offset in the direction toward the friction lining 3b and parallel to the imaginary central line of the pad retaining spring 7. This imaginary central line runs in the longitudinal direction of the pad retaining spring 7.

In contrast with the first embodiment, the length of the central section 7a corresponds to approximately one-half the length of the central section 7a of the pad retaining spring 7 of the first embodiment.

An arm 7b, 7'b is mounted at each end of the central section 7a. The arms 7b, 7'b are much longer in contrast with those of the first embodiment, for example, approximately twice as long as the central section 7a.

Each arm 7b, 7'b is provided with a slot 7g, 7'g in the region of its free end. Each slot 7g, 7'g serves to receive a guide protrusion 3g, 3'g.

On each free end of an arm 7b, 7'b, a pressure section 7c, 7'c is mounted by an intermediate section 7e, 7'e. Each intermediate section 7e, 7'e is folded downward from the respective arm end toward the top side 3d of the rear plate 3a at an obtuse angle here. Each pressure section 7c, 7'c is therefore folded upward in the opposite direction on the respective free end of an intermediate section 7e, 7'e. The pressure sections 7c, 7'c each extend laterally over the pad rear plate 3a and protrude away from it at a distance corresponding approximately to the extent of the respect brake carrier horn 5a, 5'a in the longitudinal direction of the pad rear plate 3a.

The fastening section 3f protrudes away from the top side 3d of the pad rear plate 3a and has a complete opening 19, which runs through the pad rear plate 3a in the direction of the axis of rotation 2a of the brake disc. On the side of the pad rear plate 3a, on which the friction lining 3b is mounted, the friction lining 3b is recessed in the region of the opening 19 beneath and next to it, as can be seen clearly in FIG. 13.

The fastening element 20 (see FIG. 16) is designed here in the form of a clamp and comprises a plate 20a, on each of whose longitudinal sides is mounted a trapezoidal side wall 20b, 20c, each approximately at a right angle. The trapezoidal side walls 20b, 20c run parallel and are connected at their short lower sides by a transverse section 20d. The transverse section 20d is mounted on one side wall 20b at a right angle and connected to the lower side of the other side wall 20c at a joint 20e, for example, a weld. The transverse section 20d runs parallel to the plate 20a and extends through the opening 19 in the assembled state of the pad retaining spring 7. The connection 20e is created after assembly.

In the assembled state, the one trapezoidal side wall 20b is guided through the slot 7f running in the longitudinal direction of the pad retaining spring 7. A wider longitudinal section of the central section 7a of the pad retaining spring 7 is arranged between the side walls 20b, 20c and between the lower side of the plate 20a and the top side 3d of the fastening section 3f of the pad rear plate 3a with a certain play in the radial direction from the axis of rotation 2a of the brake disc.

In the assembled state of the pad retaining spring 7 on the top side 3d of the pad rear plate 3a, the guide protrusions 3g, 3'g each extend through a slot 7g, 7'g in the pad retaining spring 7 and protrude away from the top side of each arm 7b, 7'b. Contact sections 9, 9' on the bottom sides of the pressure sections 7c, 7'c of the pad retaining spring 7 are each in contact with a respective supporting section 8, 8' as already described above.

In this embodiment, the pad rear plate 3a also has upper chamfered corner sections 3e, 3'e each having a chamfer 3i, 3'i. Each chamfer 3i, 3'i develops into a guide protrusion 3g, 3'g and into the top side 3d of the pad rear plate 3a by way of a recess 3h, 3'h. The recesses 3h, 3'h run from the respective chamfer 3i, 3'i first in a straight section, which then has a curvature in the transition to the respective guide protrusion 3g, 3'g and the top side 3d.

Figure 17:
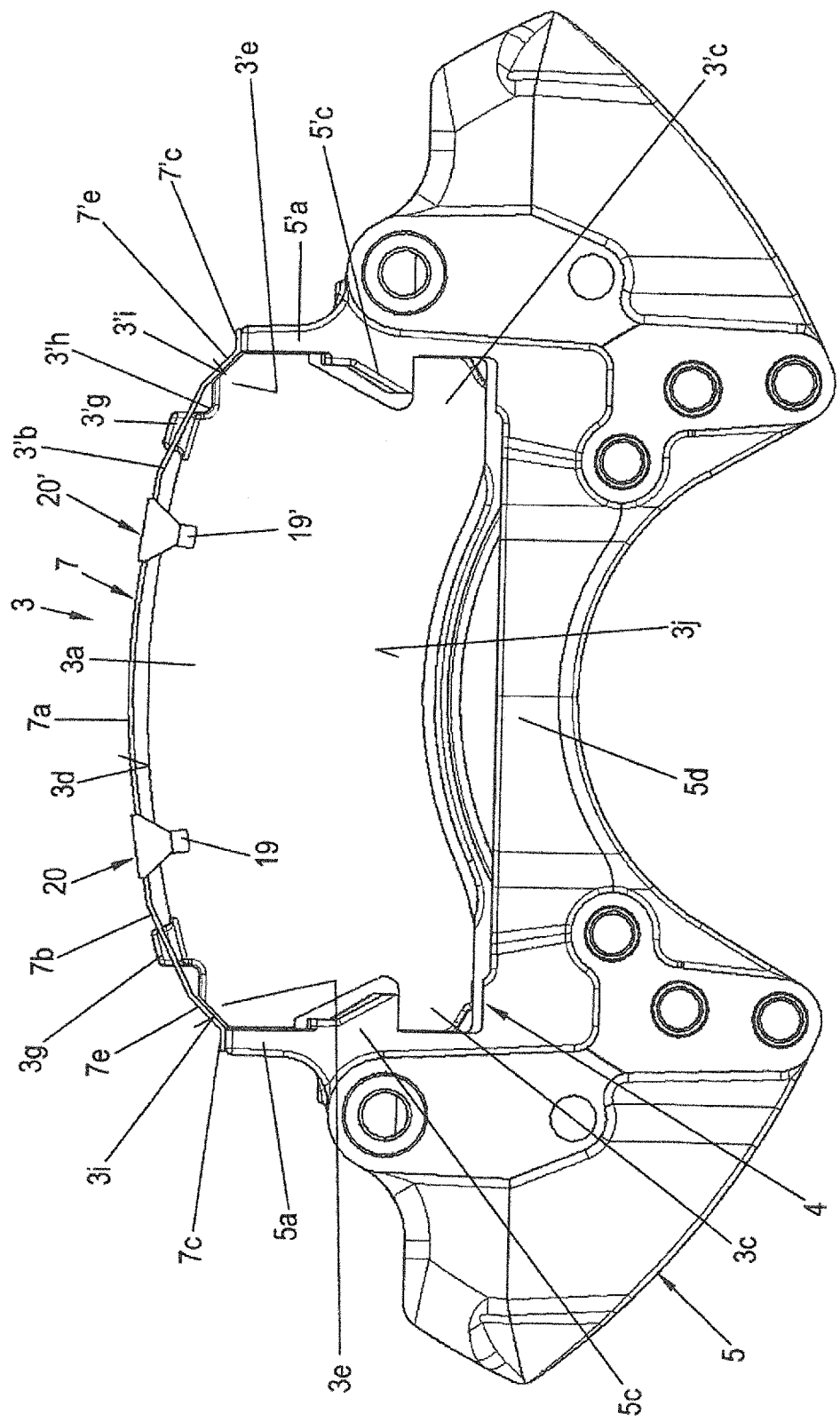
FIGS. 17-18 show schematic partial views of a fourth embodiment of the disc brake according to the invention.
Figure 18:
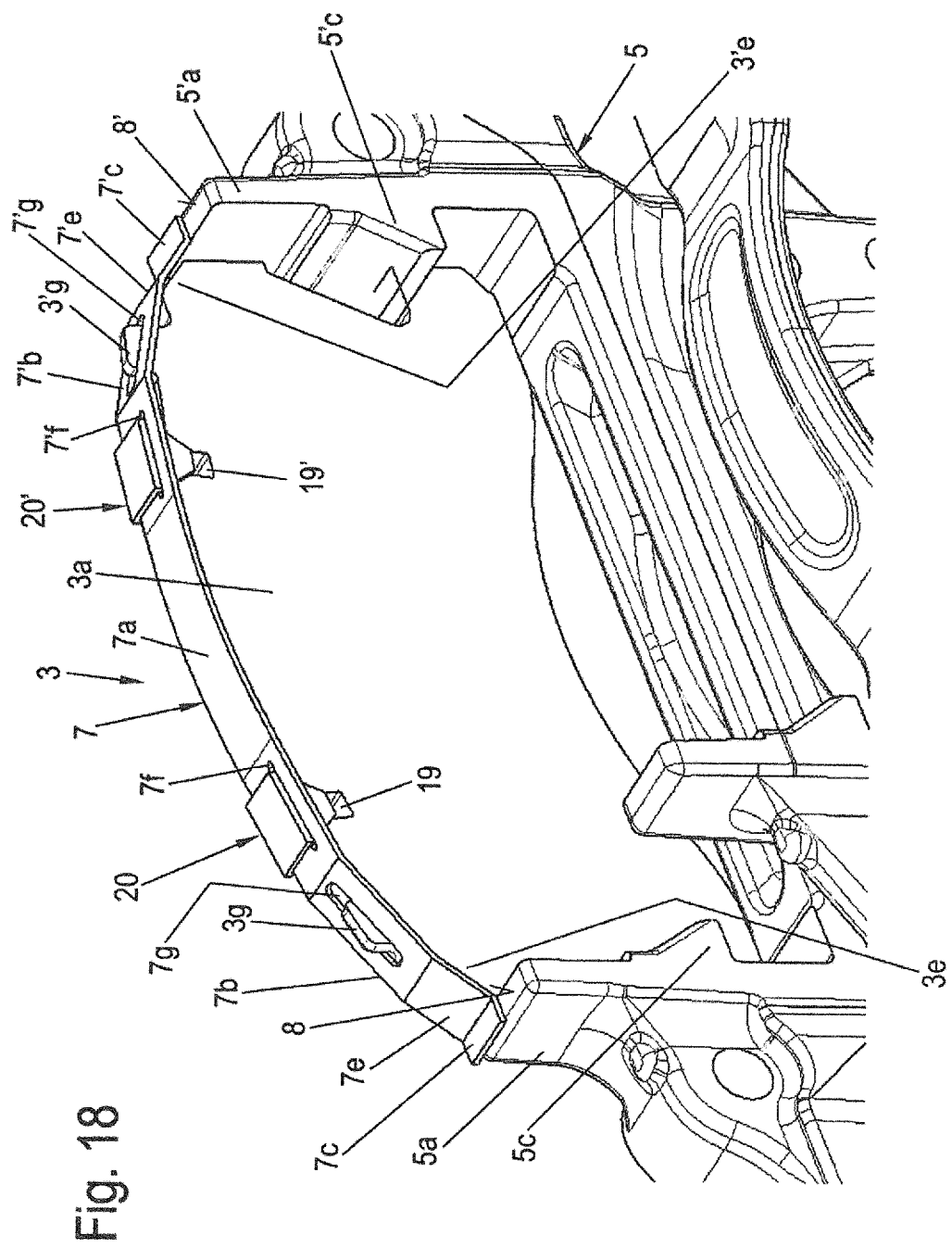

FIGS. 17-18 show schematic partial views of a fourth embodiment of the disc brake 1 according to the invention, wherein FIG. 17 shows a view of the actuating side 3j of the pad rear plate 3 as seen from the clamping side ZS (FIG. 1). FIG. 18 shows a view of the pad rear plate 3a without the friction lining 3b from the brake disc 2. FIG. 19 shows a schematic perspective view of the pad rear plate 3a of the brake pad 3 of the fourth embodiment according to FIGS. 17-18, as seen from the side of the friction lining 3b. The friction lining 3b is not shown here but is easy to imagine. FIG. 20 shows a schematic perspective view of the pad retaining spring 7 of the embodiment according to FIGS. 17-18.

In contrast with the third embodiment, the pad rear plate 3a does not have a fastening section 3f with an opening 19, but instead has a top side 3d, which is continuous between the guide protrusions 3g, 3'g. In this fourth embodiment, two openings 19, 19' are provided, each being arranged in proximity to a guide protrusion 3g, 3'g. The distance of these openings 19, 19' from one another is less than the distance of the guide protrusions 3g, 3'g among one another.

The pad retaining spring 7 of the fourth embodiment is fastened to the pad rear plate 3a by a fastening element 20, 20' in contrast with the third embodiment in the end region of the central section 7a. The fastening elements 20, 20' are designed in the same embodiment. A description in this regard has already been given above.

The pad retaining spring 7 in this third embodiment comprises the central section 7a, arms 7b, 7'b, pressure sections 7c, 7'c and intermediate sections 7e, 7'e.

The central section 7a is provided with a slot 7f, 7'f for receiving a section of the respective fastening element 20, 20', as described above, this slot running in the longitudinal direction of the pad retaining spring 7.

In contrast with the third embodiment, the length of the central section 7a corresponds approximately to three times the length of the central section 7a of the pad retaining spring 7 of the third embodiment and is somewhat shorter than the distance between the guide protrusions 3g, 3'g.

One arm 7b, 7'b is mounted on each end of the central section 7a. The arms 7b, 7'b are each approximately half as long as an arm 7b, 7'b in the third embodiment.

Each arm 7b, 7'b is provided with a slot 7g, 7'g in the region of its free end. The slots 7g, 7'g each serve to receive a guide protrusion 3g, 3'g.

The pressure section 7c, 7'c is mounted on each free end of an arm 7b, 7'b by an intermediate section 7e, 7'e, as already described in conjunction with the third embodiment.

The pad retaining spring 7 is mounted by the fastening elements 20, 20' on the pad rear plate 3a, so that the central section 7a runs essentially at a constant distance from the top side 3d of the pad rear plate 3a.

A brake pad set has the at least one brake pad 3 on the clamping side and at least one brake pad on the rear side. These brake pads may also be of different lengths.

Figure 21:
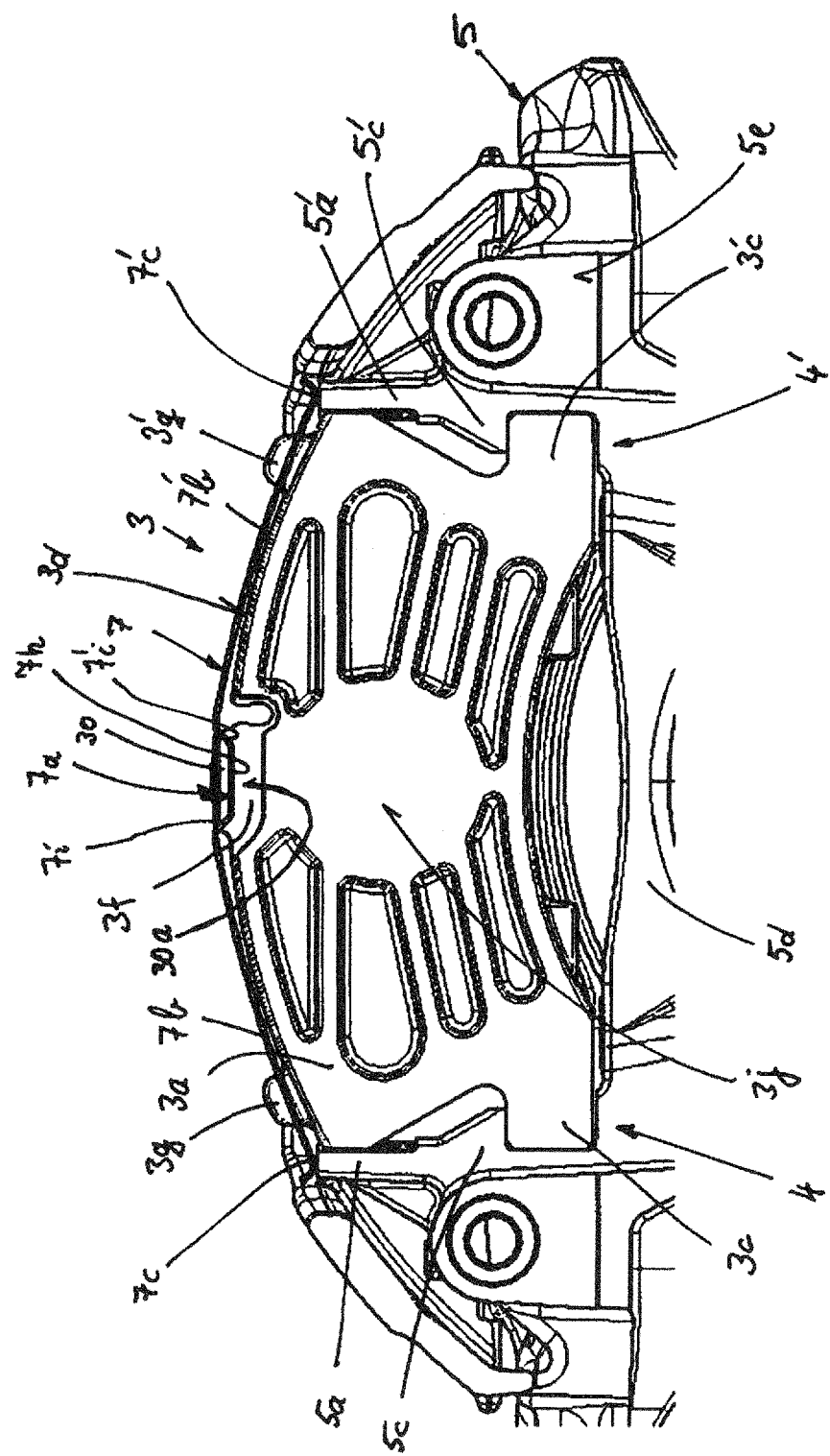
FIG. 21 shows schematic partial views of a fifth embodiment of the disc brake according to the invention.

FIG. 21 shows a schematic partial view of a fifth embodiment of the disc brake 1 according to the invention from the direction of the clamping side ZS toward the activating side 3j of the brake pad 3 on the clamping side.

Figure 22:
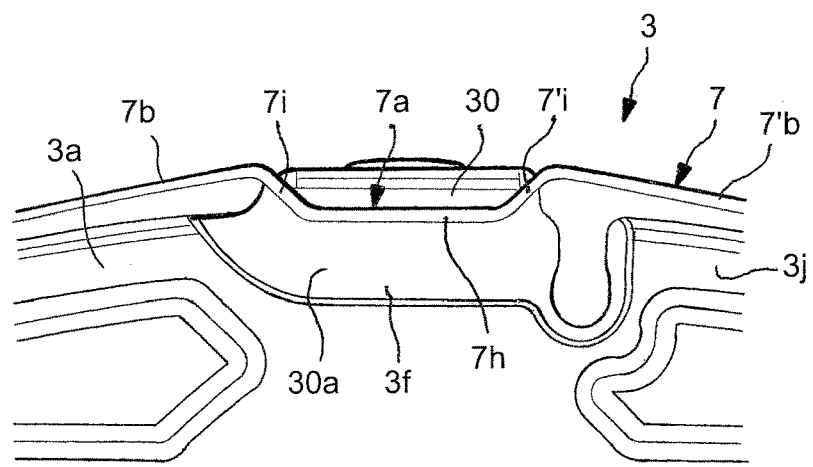
FIGS. 22-24 show schematic enlarged partial views of the fifth embodiment of the disc brake as shown in FIG. 21.
Figure 23:
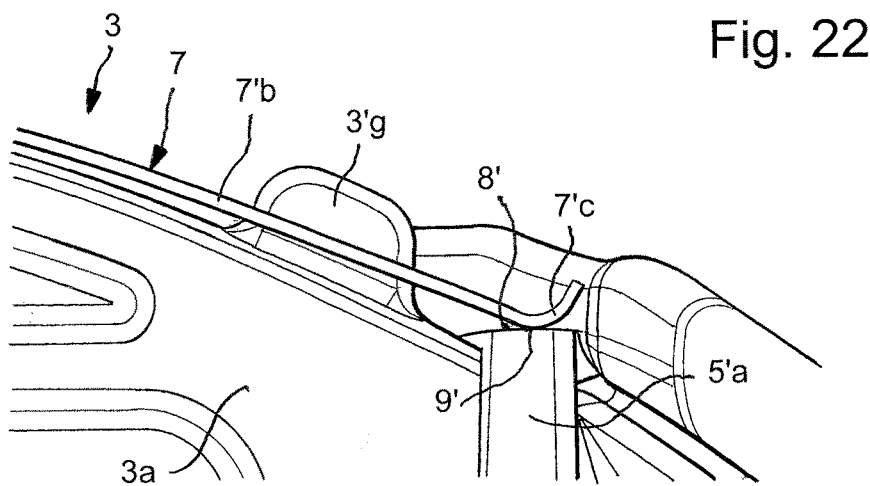
Figure 24:
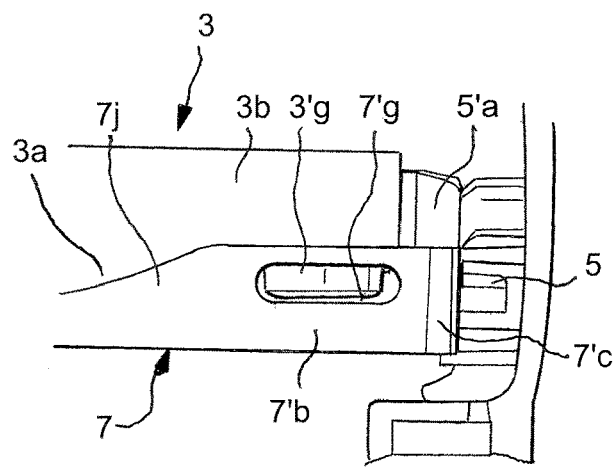

FIGS. 22-25 show enlarged schematic partial views of the fifth embodiment of the disc brake according to the invention, as shown in FIG. 21. Thus, FIG. 22 shows a central upper section of the pad rear plate 3a with a retainer for the pad retaining spring 7. FIG. 23 shows one end on the inlet side of the pad retaining spring 7 like that in FIG. 4, for example. Finally, FIG. 24 shows the end according to FIG. 23 on the inlet side in a view from the top.

In this fifth embodiment, the components of the disc brake 1 are the same as those in the third embodiment (FIG. 12) except for the brake pad 3 and the pad retaining spring 7. Therefore, only the differences in the brake pad 3 and the respective pad retaining spring 7 are discussed further here.

In contrast with the first embodiment, the pad retaining spring 7 has a central section 7a with a different design and has continuous arms 7b, 7'b, each having a pressure section 7c, 7'c. The term "continuous" as used here is understood to mean that the arms 7b, 7'b do not have any transitional sections 7d, 7'd as additional supporting lugs to support the respective arm 7b, 7'b on the top side 3d of the pad rear plate 3a (similar to FIG. 2).

The central section 7a here includes a retaining section 7h, which runs in a straight line and is connected at each end to the respective arm 7b, 7'b by a connecting section 7i, 7'i in such a way that the retaining section 7h is bent with respect to the pad rear plate 3a toward the bottom.

In its retaining section 7h and the two connecting sections 7i, 7'I, the central section 7a cooperates with the fastening section 3f of the pad rear plate 3a. In doing so, the fastening section 3f, on the one hand, forms a fixation of the central section 7a and thus of the pad retaining spring 7 connected to it to prevent lateral slippage in the direction of the axis of rotation 2a of the brake disc, in other words, to prevent slippage from the top side 3d of the pad rear plate 3a in the direction of the friction lining 3b.

On the other hand, the fastening section 3f with a lug 30 forms another fixation of the central section 7a and thus of the pad retaining spring 7 connected to it, facing in the radial direction away from the top side 3d of the pad rear plate 3a (FIG. 22).

The fastening section 3f protrudes from the top side 3d of the pad rear plate 3a. The lug 30 is mounted on the upper edge of the fastening section 3f and extends, on one hand, from the top side 3d protruding in the longitudinal direction of the fastening section 3f. On the other hand, the lug 30 also protrudes in the direction of the axis of rotation 2a of the brake disc toward the actuating side 3j. In other words, it forms a protrusion.

The lug 30 in this example is created by producing a contour of a contact surface 30a, for example, beneath the lug 30 on the fastening section 3f by machining, for example, milling or grinding. Other production options are of course also conceivable such as, for example, by an additional component.

The central section 7a of the pad retaining spring 7 is in contact with the retaining surface 30a at one side edge of the retaining section 7h and side edges of the connecting sections 7i, 7'i, wherein the side edges and the top sides of the inclined connecting sections 7i, 7'i are in contact with the lower side and/or ends of the lower side of the lug 30.

When the brake pad 3 is installed, the pad retaining spring 7 is then supported on the pad carrier horns 5a, 5'a with its pressure sections 7c, 7'c and pulls the brake pad 3 in the radial direction upward/outward by the interaction of the central section 7a with the lug 30. The pad rear plate 3a of the brake pad 3 here is pulled into contact with the undercut surfaces 14, 14' of the protrusions 3c, 3'c on the undercut surfaces 13, 13' on the bottom sides of the lugs 5c, 5'c of the brake carrier horns 5a, 5'a with no play, as described above.

The length of the central section 7a corresponds approximately to the length of the top side of the fastening section 3f.

In contrast with the third embodiment, the arms 7b, 7'b extend from each side of the fastening section 3f of the pad rear plate 3a over their top side 3d up to their respective end and beyond.

In the region of its free end, each arm 7b, 7'b is provided with a slot 7g, 7'g. The slots 7g, 7'g each serve to receive a guide protrusion 3g, 3'g. The pad retaining spring 7 is secured against twisting by the guide protrusions 3g, 3'd of the pad rear plate 3a accommodated in the slots 7g, 7'g. In other words, the pad retaining spring 7 cannot rotate about a vertical axis in the region of its central section 7a around the fastening section 3f of the pad rear plate 3a or around its imaginary longitudinal axis.

The respective end region with the slots 7g, 7'g of the pad retaining spring 7 in front of the respective pressure section 7c, 7'c is widened toward the friction lining 3b. This widened area extends up to the respective end of the pressure sections 7c, 7'c. The slots 7g, 7'g are thus no longer located centrally in an imaginary midline of the pad retaining spring 7 in this region.

Furthermore, this width of each arm 7b, 7'b of the pad retaining spring 7 is reduced in the direction of the central section 7a, wherein a recess 7j is provided on the side of the friction lining 3b. This results in a reduction in the width of the pad retaining spring 7 between the slots 7g and 7'g, at least in the central section 7a.

Figure 25:
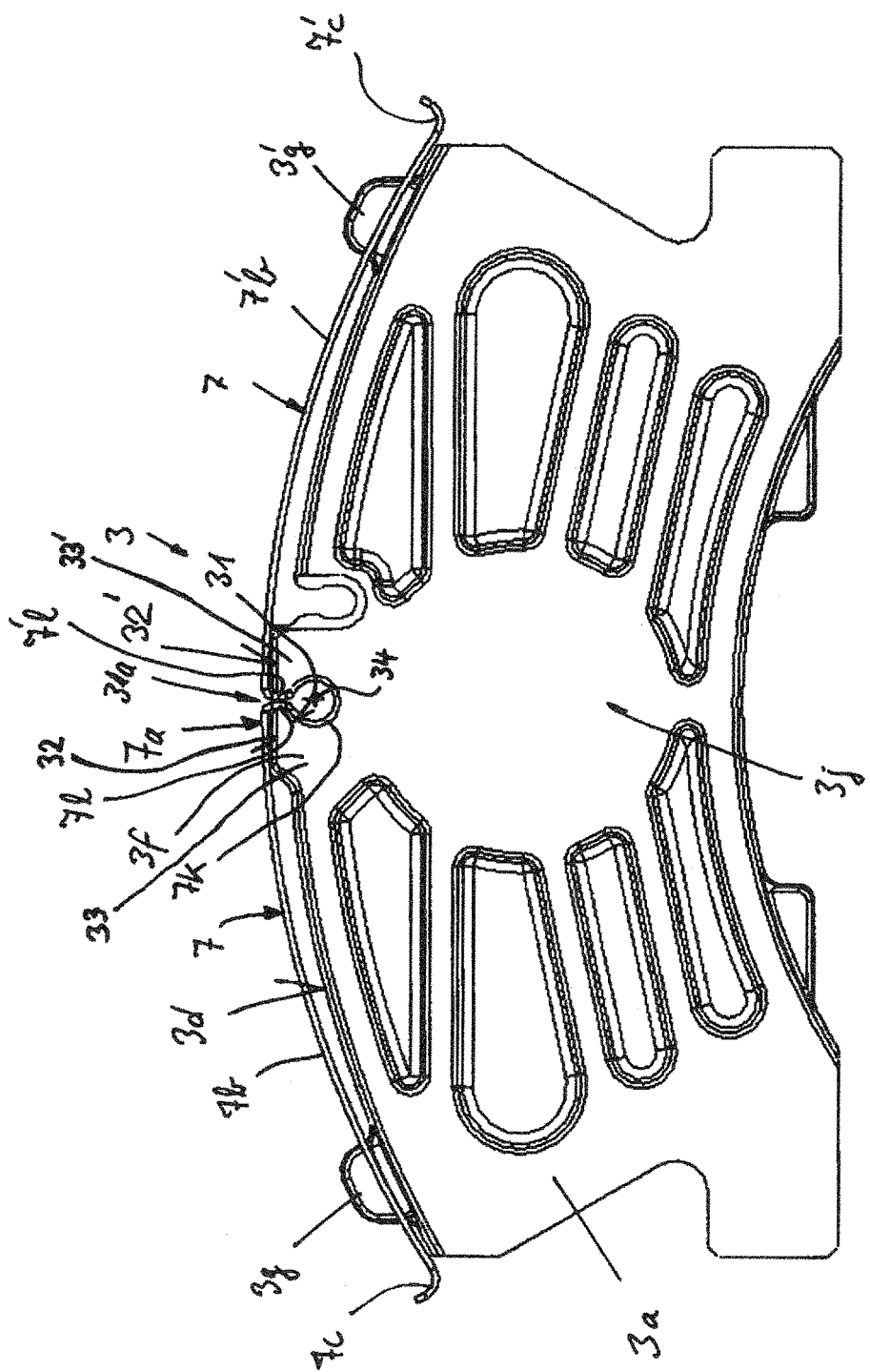
FIG. 25 shows a schematic partial view of the sixth embodiment of the disc brake according to the invention.
Figure 26:
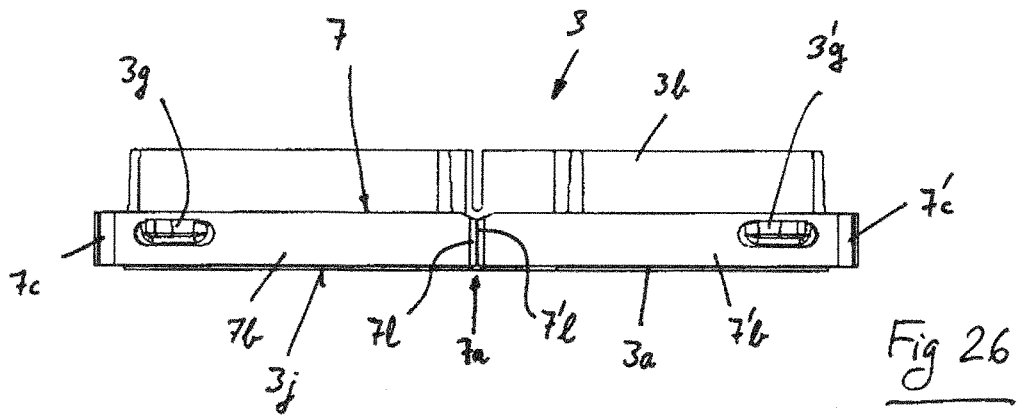
FIG. 26 shows a schematic top view of a pad rear plate of a brake pad of the sixth embodiment shown in FIG. 25.
Figure 27:
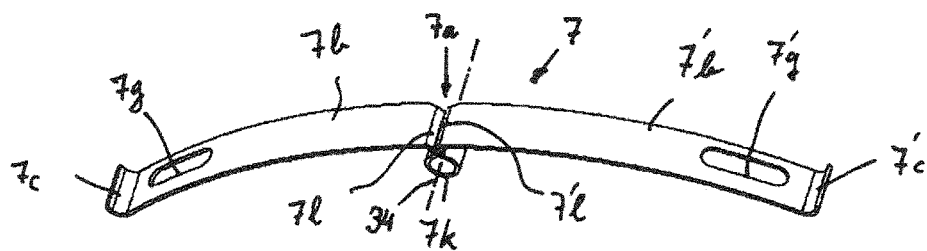
FIG. 27 shows a schematic perspective view of a pad retaining spring of the brake pad shown in FIGS. 25 and 26.
Figure 28:
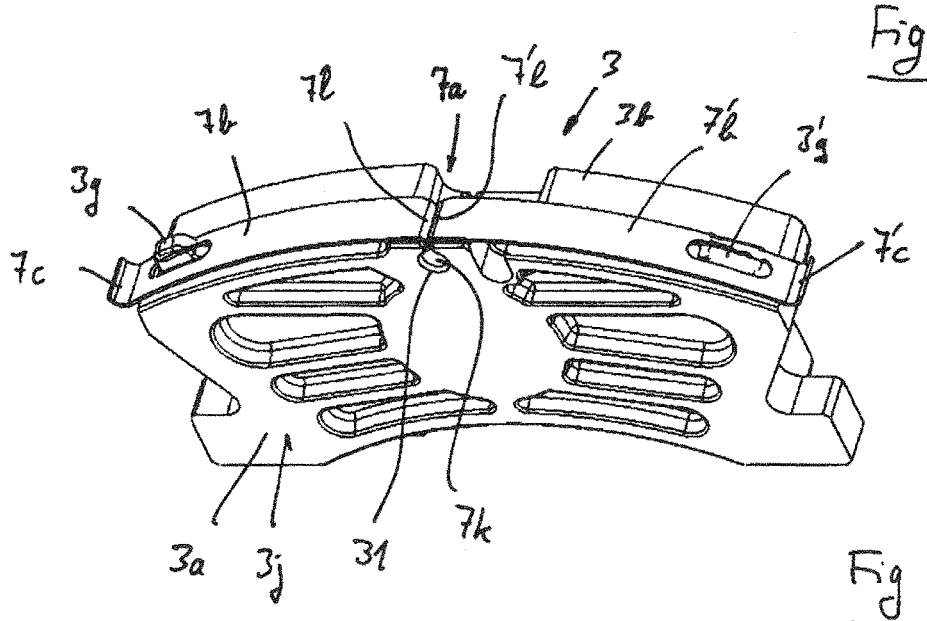
FIG. 28 shows a schematic perspective view of the brake pad shown in FIGS. 25 and 26.

FIG. 25 shows a schematic partial view of a sixth embodiment of the disc brake 1 according to the invention. FIG. 26 shows a schematic top view of a brake pad 3 of the sixth embodiment according to the invention, as shown in FIG. 25. FIG. 27 shows a schematic perspective view of a pad retaining spring 7 of the brake pad 3 according to the invention, as shown in FIGS. 25 and 26; and FIG. 28 shows a schematic perspective view of the brake pad 3 according to the invention, as shown in FIGS. 25 and 26.

The brake pad 3 differs from that of the fifth embodiment in the design of the fastening section 3f, which here has a retaining opening 31 with a slot 31a.

The fastening section 3f protrudes away from the top side 3d of the pad rear plate 3a. The retaining opening 31 here is a through-opening with a central axis 34 extending in parallel to the axis of rotation 2a of the brake disc. Instead of a circular cross section as the through-opening, the retaining opening 31 may also have a different cross section, such as, for example, a triangular or polygonal cross section. It is also conceivable for the retaining opening 31 to be shaped into the material of the pad rear plate 3a only from one side, for example, the actuating side 3j, and to form a blind hole without a continuous retaining opening 31 that goes all the way through to the other side of the friction lining 3b. Then the slot 31 can also be shaped from the same side of the pad rear plate 3a.

The slot 31a runs from the top side 32, 32' of the fastening section 3f in the radial direction from the top side 32, 32' up to the retaining opening 31 and then opens in the retaining opening 31 at its lower end. The retaining opening 31 and the slot 31a divide the fastening section 3f into two subsections 33, 33' with the respective top side 32, 32'.

The pad retaining spring 7 of the sixth embodiment differs from the pad retaining spring 7 of the fifth embodiment in that it has a constant width over the total length of top side 3*d* of the pad rear plate 3*a* and by a middle section 7*a* of a different design.

The pad retaining spring 7 thus protrudes in the direction of the friction lining 3*b* over the pad rear plate 3*a*. Therefore, assembly of the brake pad 3 can be simplified. The brake pad 3 on the clamping side is inserted between a pressure piece of a clamping device, which is arranged in the clamping section 6*a* of the brake caliper 6, and one of the brake carrier horns 5*a*, 5'*a* on the clamping side (FIG. 1). Due to the protrusion of the pad retaining spring 7 beyond the pad rear plate 3*a*, the pad retaining spring 7 rests first on the brake carrier horn 5*a*, 5'*a* and is prestressed by pressing on the brake pad 3, and the brake pad 3 is inserted into the brake carrier 5.

The central section 7*a* of the pad retaining spring 7 here includes a retaining section 7*k* and two connecting sections 7*l*, 7'*l*.

The retaining section 7*k* has a circular cross section with a central axis 34, which runs parallel to the axis of rotation 2*a* of the brake disc and is designed like a pipe clamp with two connecting sections 7*l*. The connecting sections 7*l*, 7'*l* are each connected at one end to a respective free end of the circular retaining section 7*k* and extend straight and in parallel to one another radially upward. The free open ends of the connecting sections 7*l* are each connected to one arm 7*b*, 7'*b* of the pad retaining spring 7. These connecting locations may be provided with a small radius or a chamfer by folding or bending. In one embodiment, the pad retaining spring 7 is designed in one piece as a punched/bending part with the central section 7*a*, the arms 7*b*, 7'*b* and the pressure sections 7*c*, 7'*c*, wherein the circular retaining section 7*k* is created by rolling/bending.

The shape of the retaining section 7*k* corresponds to the shape of the retaining opening 31. The pad retaining spring 7 is mounted on the brake pad 3 in such a way that the retaining section 7*k* of the pad retaining spring 7 is accommodated in the retaining opening 31 of the pad rear plate 3*a*, wherein the connecting sections 31*a* are arranged side by side next to one another in the slot 31*a*. The two arms 7*b*, 7'*b* of the pad retaining spring 7 then rest on the relatively short sections of the top side 32, 32' of the subsections 33, 33' of the fastening section 3*f* and extend above the top side 3*d* of the pad rear plate 3*a* of the brake pad 3 on the clamping side to beyond the ends of the pad rear plate 3*a*, as already described above.

The retaining section 7*k* accommodated in the retaining opening 31 of the pad rear plate 3*a* cooperates with the retaining opening 31 in a form-fitting manner, such that the pad rear plate 3*a* and thus the brake pad 3 are pulled upward, as already explained above, by the pressure sections 7*c*, 7'*c* resting on the brake carrier horns 5*a*, 5'*a*.

Due to the spring force of the retaining section 7*k*, the latter is pressed against the wall of the retaining opening. Such a form-fitting connection can also be created with other cross sections like those described above. The subsections 33, 33' form opposing lugs that are separated by the slot 31*a* and the retaining opening 31 beneath it and, due to their shape, contribute to the form-fitting connection between the retaining section 7*k* of the pad retaining spring 7 and the pad rear plate 3*a* of the brake pad 3.

A simple fastening of the pad retaining spring 7 on the brake pad 3 is formed in this way and is also simple to install.

Figure 29:
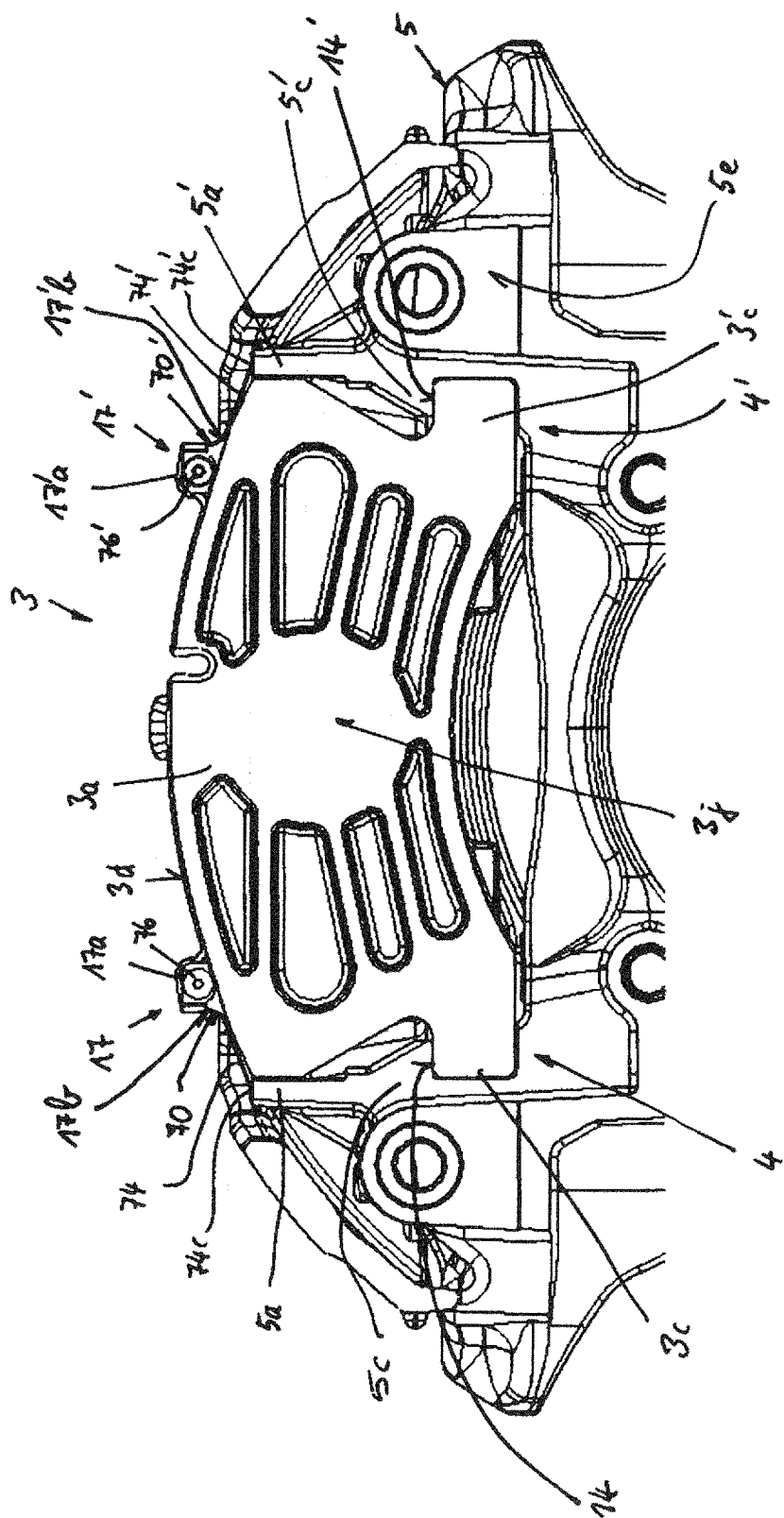
FIG. 29 shows a schematic partial view of a seventh embodiment of the disc brake according to the invention.
Figure 30:
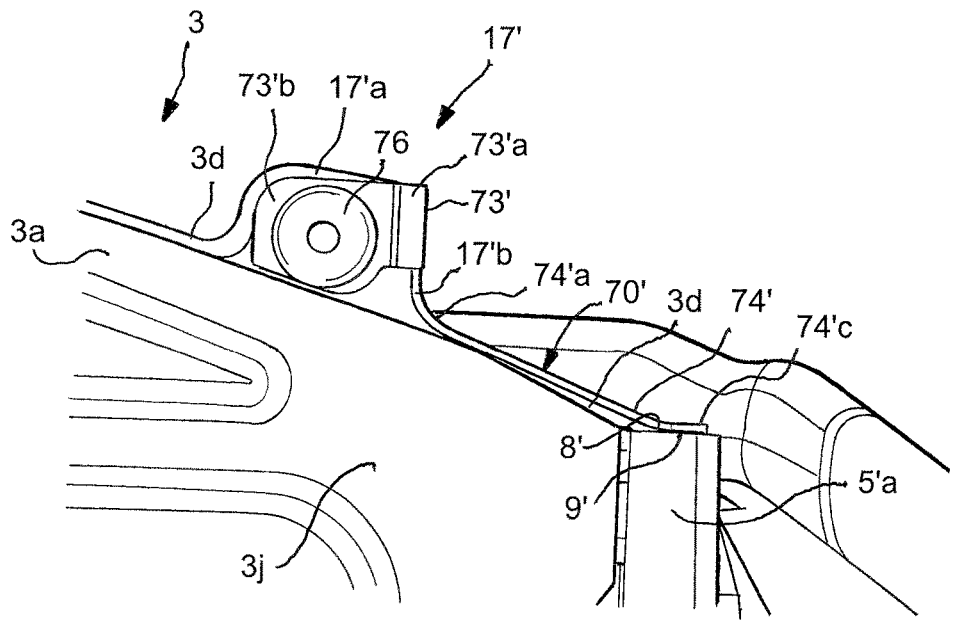
FIGS. 30-31 show schematic enlarged partial views of the seventh embodiment of the disc brake shown in FIG. 29.
Figure 31:
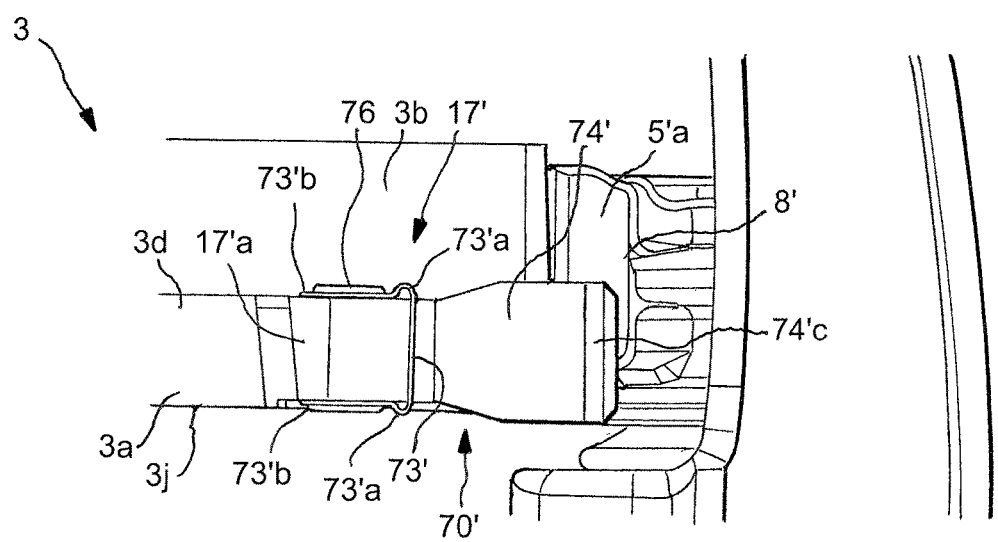
Figure 32:
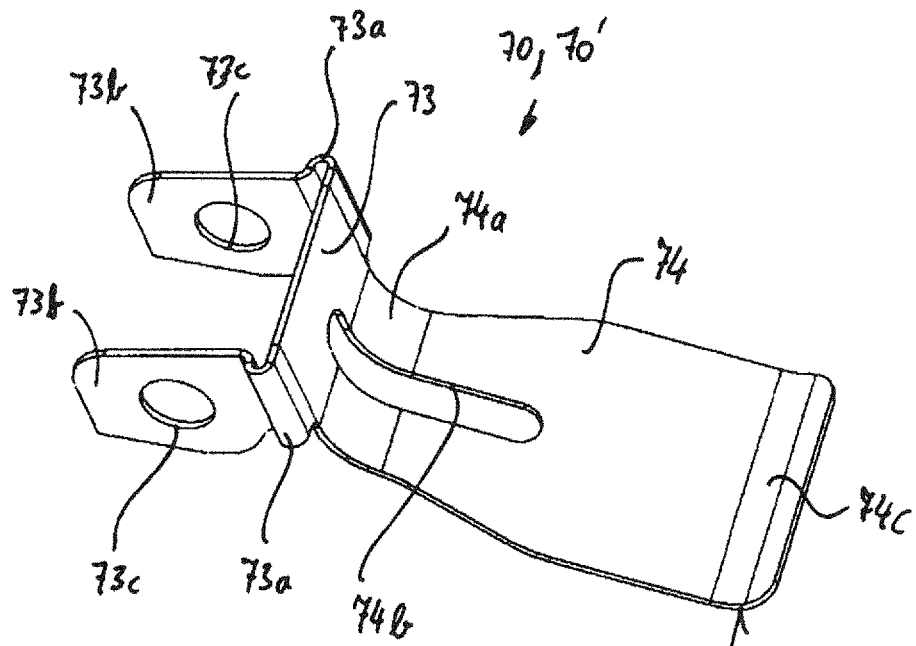
FIGS. 32-33 show schematic perspective views of pad retaining springs of the seventh exemplary embodiment of the disc brake shown in FIG. 29.
Figure 33:
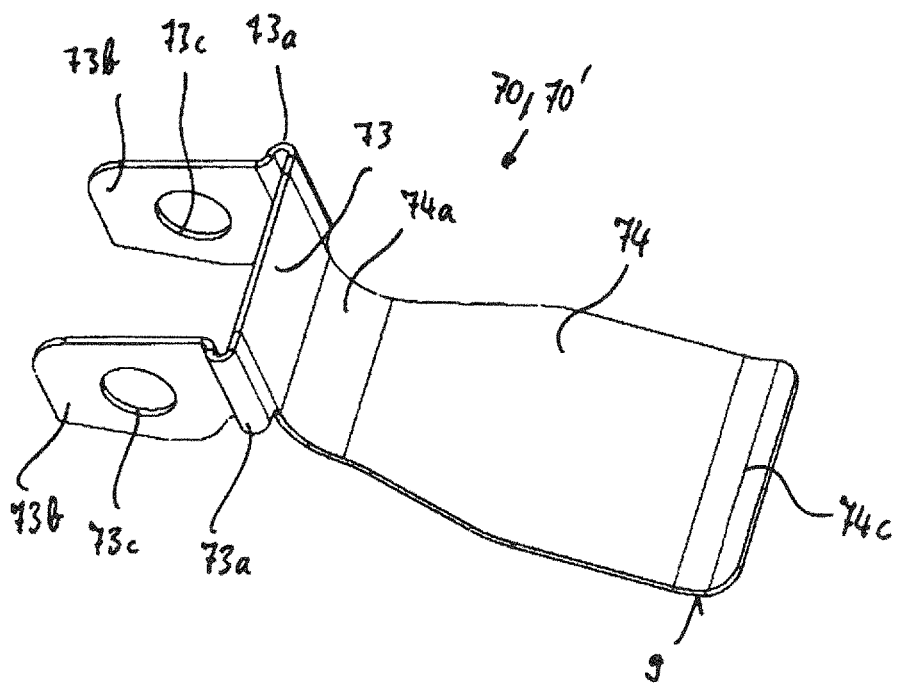

FIG. 29 shows a schematic partial view of a seventh embodiment of the disc brake 1 according to the invention. FIGS. 30 and 31 show enlarged schematic partial views of the seventh embodiment of the disc brake according to the invention, as shown in FIG. 29, where FIG. 30 shows a partial view of the region of the pad rear plate 3*a* on the inlet side with the respective brake carrier horn 5*a*, and FIG. 31 shows a top view of the view according to FIG. 30. FIGS. 32 and 33 show schematic perspective views of the pad retaining springs of the seventh embodiment of the disc brake according to the invention, as shown in FIG. 29.

In this seventh embodiment, the components of the disc brake 1 are the same as those in the second embodiment (FIGS. 8, 9) except for the brake pad 3. Therefore, only the differences in the brake pad 3 are again discussed in the remaining description.

The protrusions 17*a*, 17'*a* are plate-shaped, protrude upward from the top side 3*d* of the pad rear plate 3*a* and each form a retainer for a pad retaining springs 70, 70'. In contrast with the second embodiment, the pad retaining springs 70, 70' here are formed in part as a hood, as will be explained in greater detail below.

Each protrusion 17*a*, 17'*a* is arranged with an offset in a longitudinal line from the center of the pad rear plate at a distance from each end of the pad rear plate 3*a* facing the respective brake carrier horn 5*a*, 5'*a*, such that this distance here corresponds approximately to the thickness of the pad rear plate 3*a*. However, this distance may also be greater than the thickness of the pad rear plate 3*a*, for example. The side of each protrusion 17*a*, 17'*a* facing the respective brake carrier horn 5*a*, 5'*a* has a contact surface 17*b*, 17'*b*, which is designed here as a hollow throat.

The one rear surface of each protrusion 17*a*, 17'*a* facing the clamping side ZS is flush with the rear surface of the pad rear plate 3*a* with the friction lining 3*b* facing the clamping side ZS. However, in another example, which is not shown here, it may be necessary to have a shoulder on the rear surface of one or each protrusion 17*a*, 17'*a* facing the clamping side ZS if the surface of this rear surface or these surfaces of the unmachined part does not meet the requirements. The other rear surface of each protrusion 17*a*, 17'*a* facing the actuating side 3*j*, however, is spaced a certain distance apart from the actuating side 3*j*. This certain distance here corresponds approximately to twice the thickness of a fastening strap 73*b*, 73'*b* of the pad retaining spring 70, 70'. This distance may of course also be different, wherein the shoulder may be varied in depth. This shoulder may be necessary to obtain a clean contact surface and to be able to use the same pad retaining spring 70, 70' for both right and left.

A retaining element 76, 76' is mounted at the center of each protrusion 17*a*, 17'*a*. These retaining elements 76, 76' include rivets and bolts, for example, with which the respective pad retaining spring 70, 70' is mounted on the respective protrusion 17*a*, 17'*a* in a fixed and form-fitting manner by means of fastening straps 73*b*, 73'*b*.

Each pad retaining spring 70, 70' comprises a base plate 73, 73', two fastening straps 73*b*, 73'*b* and a spring arm 74, 74' each with a pressure section 74*c*, 74'*c*.

The pad retaining spring 70 on the outlet side is described below. The design of the pad retaining spring 70' on the inlet side is embodied in mirror image here.

The base plate 73 is designed as an elongated rectangle having a length approximately corresponding to the width of the protrusion 17 in the direction of the axis of rotation 2*a* of the brake disc. A fastening strap 73*b* is mounted on the short sides of the base plate 73 by means of a curved connecting section 73a. The fastening straps 73b extend approximately at a right angle to the base plate toward one side (to the left in FIGS. 32-33) and run parallel to one another. Furthermore, each fastening strap 73b has an opening 73c through which the fastening element 76 is passed.

The base plate 73 here is arranged in the installed state of the pad retaining spring 70, 70', so that the base plate 73 lies in a plane, which runs approximately perpendicular to the undercut surface 14, 14' of the pad rear plate 3a in the direction of the axis of rotation 2a of the brake disc.

The spring arm 74 is mounted on the longitudinal side of the base plate 73 arranged at the bottom in FIGS. 32-33 by a connecting section 74a. The connecting section 74a has a convex curvature toward the right side, such that its curvature communicates with the curvature of the contact surface 17b of the protrusion 17a, designed here as a hollow groove. The connecting section 74a develops into the spring arm 74 with a widening effect. The pressure section 74c is mounted at the right end of the spring arm 74a. The bottom side of the pressure section 74c has the contact section 9, which rests on the supporting section 8 of the respective brake carrier horn 5a in the installed state of the brake pad 3.

In the uninstalled state of the brake pad 3, the bottom side of the connecting section 74a rests on the contact surface 17b. The bottom side of the spring arm 74 here rests on the top side 3d of the pad rear plate 3a from the contact surface 17b to the end of the top side 3d. This support of the pad retaining spring 70 is made possible by a prestressed fastening of the pad retaining spring 70 on the protrusion 17a.

To obtain the spring forces of the pad retaining springs 70, 70' required for the respective application case, the pad retaining springs 70, 70' can be provided with a recess as needed. This is shown in FIG. 32, where the recess is implemented as a slot 74b.

The embodiment of the pad retaining spring 70, 70' shown in FIG. 32 has the slot 74b, which extends through the connecting section 74a by approximately one-third into the base plate 73 in an imaginary longitudinal direction of the spring arm 74 beginning in its left third facing toward the connecting section 74a.

Variants (not shown) are additionally equipped with reinforcing beads/ribs here. Reinforcements without the slot 74b may also be provided. A plurality of slots 74b may of course also be arranged side by side and/or in different positions.

Figure 34:
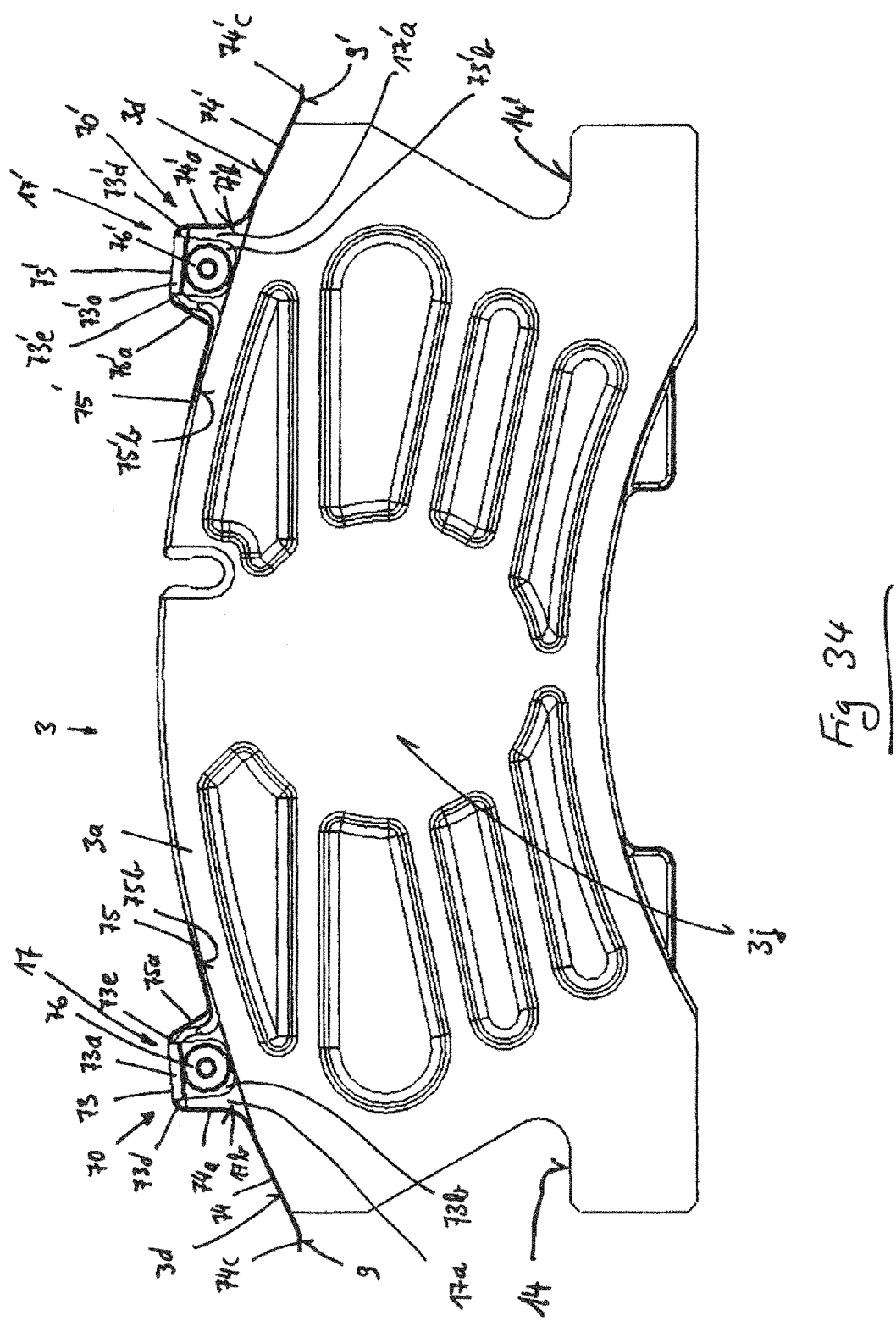
FIG. 34 shows a schematic view of a brake pad of one variant of the seventh embodiment shown in FIG. 29.
Figure 35:
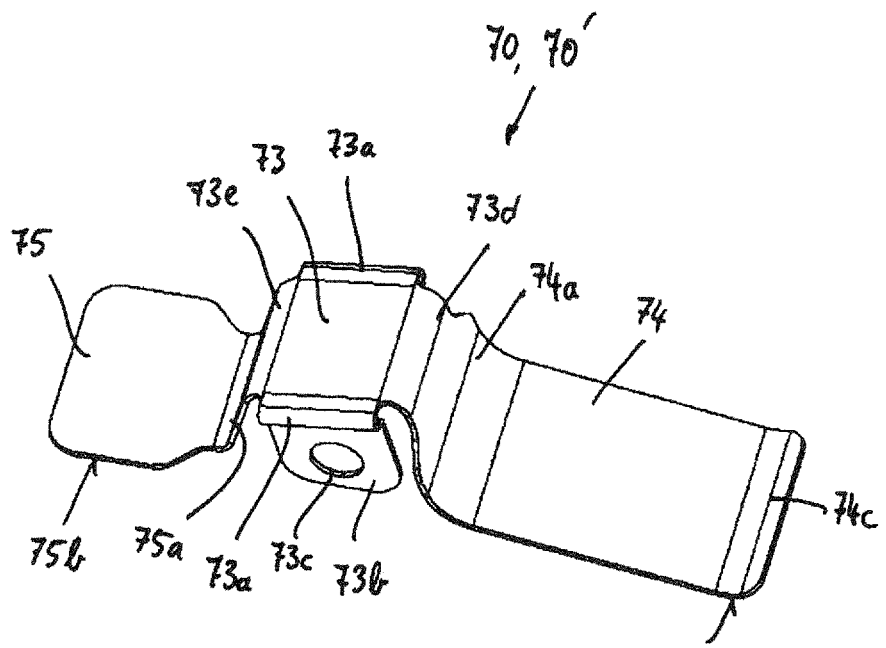
FIGS. 35-36 show schematic perspective views of pad retaining springs of the variant of the seventh embodiment shown in FIG. 34.
Figure 36:
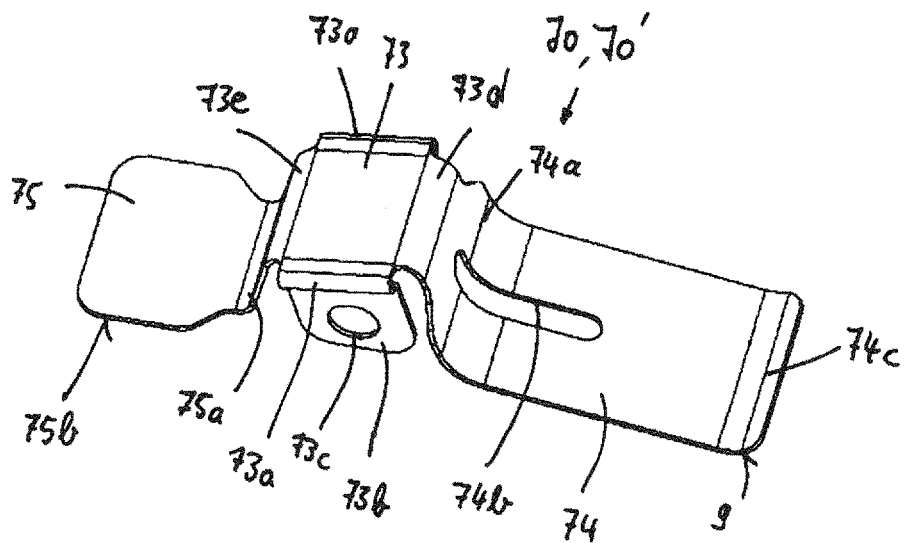

FIG. 34 shows a schematic view of a brake pad 3 of a variant of the seventh embodiment of the disc brake 1 according to the invention, as shown in FIG. 29. Schematic perspective views of pad retaining springs 70, 70' of the variant of the seventh embodiment according to FIG. 34 are shown in FIGS. 35-36.

In contrast with the seventh embodiment, the pad retaining springs 70, 70', on the one hand, are designed in the form of hoods, and, on the other hand, are designed with a supporting arm 75, 75'. The hood shape is understood to mean that the base plate 73, 73' here is arranged in the installed state of the pad retaining spring 70, 70', so that the base plate 73, 73' lies in a plane which runs approximately parallel to the undercut surface 14, 14' of the pad rear plate 3a and is arranged above the protrusion 17a, 17'a.

On the short sides of the base plate 73, the fastening straps 73b are arranged so they are rotated by 90° counterclockwise with respect to the base plate 73 by the curved connecting sections 73a, as in the seventh embodiment according to FIG. 29, except that they are rotated by 90° counterclockwise with respect to the base plate 73. Accordingly, the spring arm 74 is designed so that it is lengthened with the connecting section 74a and is mounted on the base plate 73 by a curved connecting section 73d. The connecting section 74a and the connecting section 73d form a joint S-shaped connecting section, wherein the connecting section 74a communicates with the shape of the contact surface 17b.

The supporting section 75 is mounted on the other long side of the base plate 73 by a curved connecting section 73e and another oppositely curved connecting section 75a. The curved connecting sections 73e and 75a together form an S-shaped connecting section. The supporting arm 75 is designed in the form of a plate and has, on its bottom side, a supporting section 75b, which in the installed state of the pad retaining spring 70, 70' rests on the top side 3d of the pad rear plate 3a.

FIG. 36 shows another variant of the pad retaining spring 70 with a slot 74b, as already described in conjunction with FIG. 32.

The above description of the pad retaining spring 70 on the outlet side of the variant according to FIG. 34 is naturally also applicable to the pad retaining spring 70' on the inlet side accordingly.

The respective supporting arm 75, 75' in this way forms a support but also a hindrance of a rotational movement of the respect pad retaining spring 70, 70' in the installed state of the pad retaining springs 70, 70'.

FIG. 37 shows a schematic view of a brake pad 3 according to the invention of another variant of the seventh embodiment of the disc brake according to the invention, as shown in FIG. 29. FIGS. 38-39 show schematic perspective views of pad retaining springs 70, 70' of the additional variant of the seventh embodiment according to FIG. 37.

In this additional variant, the difference in comparison with the variant according to FIG. 34 is that the shape of the spring arm 74, of the connecting section 74a and 73d runs in a stretched form, i.e., the radii of curvature of the respective curves are larger, wherein the connecting section 74a does not communicate with the shape of the contact surface 17b, 17'b and also does not rest on the latter in the installed state of the brake pad 3.

The variant of the pad retaining spring 70 according to FIG. 38 shows a slot 74b, which extends centrally in the longitudinal axis through the connecting sections 74a and 73b to more than approximately three-fourths of the base plate 73. This is of course also true of the pad retaining spring 70' on the inlet side.

Statements about the slots 74b, 74'b, including the reinforcing beads/ribs (not shown) are naturally also applicable here.

The pad retaining springs 70, 70' of the seventh embodiment, including the variants thereof, are produced from spring steel.

The invention is not restricted by the embodiments described above but instead can be modified within the scope of the attached claims.

Thus, for example, it is conceivable for the brake carrier 5 to be implementable with a so-called radial groove 21 for simple installation of the brake pad 3. The groove 21 extends in the direction of the respective brake carrier horn 5a, 5'a between one side of the respective lug 5c, 5'c and one edge of the respective brake carrier horn 5a, 5'a. This is illustrated in FIG. 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 1 disc brake
2 brake disc
2a axis of rotation of the brake disc
3 brake pad
3a pad rear plate
3b friction lining
3c, 3'c protrusion
3d top side
3e, 3'e corner section
3f fastening section
3g, 3'g guide protrusion
3h, 3'h recess
3i, 3'i chamfer
3j actuating side
4, 4' undercut
5 brake carrier
5a, 5'a; 5b, 5'b brake carrier horn
5c, 5'c lug
5d strut
5e fastening side
5f strut
6 brake caliper
6a clamping section
6b reaction section
6c, 6'c connecting section
7 pad retaining spring
7a central section
7b, 7'b arm
7c, 7'c pressure section
7d, 7'd transitional section
7e, 7'e intermediate section
7f, 7'f; 7g, 7'g slot
7h retaining section
7i, 7'i connecting section
7j taper
7k retaining section
7l, 7'l connecting section
8, 8' supporting section
9, 9' contact section
10 main direction of rotation
10a pivot point
11, 12 force
11a, 12a lever arm
13, 13' undercut surface
14, 14' undercut surface
15, 16 pad slot
17, 17' spring retainer
17a, 17'a protrusion
17b, 17'b contact surface
18, 18' retaining element
19, 19' opening
20, 20' fastening element
20a plate
20b, 20c side wall
20d transverse section
20e connection
21 groove
30 retaining lug
30a contact surface
31 retaining opening
31a slot
32, 32' top side
33, 33' subsection
34 central axis
35, 35' side surface
70, 70' pad retaining spring
70a central section
70b, 70c transitional section
71, 71' pressure section
72, 72' bearing section
72a support section
73, 73' base plate
73a, 73'a connecting section
73b, 73'b fastening strap
73c opening
73d, 73'd connecting section
73e, 73'e connecting section
74, 74' spring arm
74a, 74'a connecting section
74b slot
74c, 74'c pressure section
75, 75' supporting arm
75a, 75'a connecting section
75b, 75'b supporting section
76, 76' fastening element
RS rear side
ZS clamping side

What is claimed is:

1. A disc brake for a vehicle, comprising:
a brake disc;
at least two brake pads, the at least two brake pads including a clamping side brake pad located on a clamping side of the brake disc and a rear side brake pad located on a rear side of the brake disc;
a brake carrier configured to accommodate the at least two brake pads in respective clamping side and rear side brake pad slots, the brake carrier having at least one brake horn at a lateral side of at least the clamping side brake pad slot;
a brake caliper configured to straddle the brake disc when in an installed position on the brake carrier with a clamping side and arranged to apply the clamping side brake pad against the clamping side of the brake disc and a rear side arranged to apply the rear side brake pad against the rear side of the brake disc,
wherein the clamping side brake pad
is located in form-fitting engagement with the clamping side pad slot with respect to a radial direction perpendicular to a rotation axis of the brake disc,
includes at least one pad retaining spring configured to be supported on the at least one clamping side brake carrier horn and to exert a radially outward tensile force on the clamping side brake pad.

2. The disc brake according to claim 1, wherein the form-fitting engagement of the clamping side brake pad with the clamping side pad slot includes form-fitting engagement of a pad rear plate of the clamping side brake pad with a contour of the at least one clamping side brake carrier horn.

3. The disc brake according to claim 2, wherein the contour of the at least one clamping side brake carrier horn includes an undercut surface configured to engage an undercut surface of an opposing protrusion of the pad rear plate without play when the clamping side brake pad is subject to the radially outward tensile force exerted by the at least one pad retaining spring.

4. The disc brake according to claim 3, wherein the at least one pad retaining spring is mounted on the pad rear plate.

5. The disc brake according to claim 4, wherein the at least one pad retaining spring is located on a top side of the pad rear plate.

6. The disc brake according to claim 5, wherein
the at least one pad retaining spring includes a central section, arms on opposite sides of the central section between the central section and respective adjacent pressure sections, and transitional sections between the central section and the arms,
the central section is located on the top side of the pad rear plate,
the transitional sections are located over the top side of the pad rear plate, and
the pressure sections extend beyond lateral sides of the pad rear plate.

7. The disc brake according to claim 6, wherein
the at least one brake horn includes two brake horns located at laterally opposite side of the clamping side brake pad slot, and
at least one of the pressure sections is configured to be supported on at least one of the two clamping side brake carrier horns.

8. The disc brake according to claim 3, wherein
the at least one pad retaining spring is held and guided on the pad rear plate.

9. The disc brake according to claim 8, wherein
the at least one pad retaining spring includes a central section, arms on opposite sides of the central section between the central section and respective adjacent pressure sections, and transitional sections between the central section and the arms,
the central section is configured to cooperate with a retaining section and connecting sections interact with a fastening section of the pad rear plate, such that the fastening section
inhibits lateral movement of the central section and the at least one pad retaining spring in an axial direction toward a friction lining, and
inhibits radial movement of the central section and the at least one pad retaining spring in the radial direction away from the top side of the pad rear plate.

10. The disc brake according to claim 9, wherein
the fastening section and a lug cooperate to inhibit the radial movement of the central section and the at least one pad retaining spring in the radial direction.

11. The disc brake according to claim 10, wherein
the fastening section extends away from the top side of the pad rear plate, and
the lug is mounted on an upper edge of the fastening section and extends as a protrusion toward an actuating side of the pad rear plate facing away from the brake disc.

12. The disc brake according to claim 11, wherein
the lug is a contour forming a retaining surface on a bottom side of the fastening section.

13. The disc brake according to claim 12, wherein
the central section of the at least one pad retaining spring contacts the retaining surface along a side edge of the retaining section and side edges of connecting sections, and
the side edge and top sides of the connecting sections contact at least one of a bottom side of the lug and ends of the bottom side of the lug.

14. The disc brake according to claim 13, wherein
the at least one pad retaining spring includes at least one slot configured to accommodate a guide protrusion of the pad rear plate extending through the at least one slot.

15. The disc brake according to claim 14, wherein
the at least one slot includes two slots, and
the at least one pad retaining spring includes a recess formed by a reduction in width of the at least one pad retaining spring between the two slots.

16. The disc brake according to claim 14, wherein
the pressure sections extend laterally away from opposite lateral ends of the top side of the pad rear plate.

17. The disc brake according to claim 16, wherein
at least one of the pressure sections is supported on the at least one brake carrier horn of the brake carrier.

18. The disc brake according to claim 4, wherein
the at least one pad retaining spring is located in a form-fitting manner on the pad rear plate.

19. The disc brake according to claim 18, wherein
the at least one pad retaining spring includes a central section having a retaining section and two connecting sections, arms on opposite sides of the central section between the central section and respective adjacent pressure sections,
the retaining section is located in a form-fitting manner in a retaining opening of the pad rear plate, and
the two connecting sections are located in a slot of the pad rear plate.

20. The disc brake according to claim 19, wherein
the retaining section has a circular cross section with a central axis running parallel to the axis of rotation of the brake disc, and
the retaining section is configured in a pipe clamp manner with two connecting sections.

21. The disc brake according to claim 20, wherein
the retaining opening is a through-opening or a blind hole having at least one of a circular cross-section and a polygonal cross-section, and
the retaining opening is spaced radially away from a top side of a fastening section and is connected to the top side by the slot.

22. The disc brake according to claim 21, wherein
the fastening section protrudes radially away from the top side of the pad rear plate, and
the fastening section is divided by the slot into two subsections, each of the two subsections including a portion of the top side of the pad rear plate.

23. The disc brake according to claim 22, wherein
the pad retaining spring has a constant width over an entire length of the top of the pad rear plate, and
the pad retaining spring protrudes axially beyond the top of the pad rear plate in a direction of a friction lining on a brake disc side of the pad rear plate.

24. The disc brake according to claim 18, wherein
the pad retaining spring has at least one slot through which a guide protrusion of the pad rear plate extends.

25. The disc brake according to claim 24, wherein
the pressure sections protrude laterally away from the pad rear plate on each end of the top side of the pad rear plate.

26. The disc brake according to claim 25, wherein
at least one of the pressure sections is supported on the at least one brake carrier horn of the pad slot of the clamping side brake pad slot.

27. The disc brake according to claim 5, wherein
the at least one pad retaining spring includes a central section, arms on opposite sides of the central section between the central section and respective adjacent pressure sections, and transitional sections between the central section and the arms, and the central section is located on the top side of the pad rear plate, the transitional sections are located over the top side of the pad rear plate, the central section is affixed to the top side of the pad rear plate by at least one fastener, and the pressure sections extend beyond lateral sides of the pad rear plate.

28. The disc brake according to claim 27, wherein the at least one fastener is a clamp, the clamp including a transverse section configured to extend through an opening in the pad rear plate with the at least one pad retaining spring located between the at least one fastening element and the top side of the pad rear plate.

29. The disc brake according to claim 27, wherein the at least one pad retaining spring includes at least one slot configured to accommodate a section of the at least one fastener extending through the at least one slot.

30. The disc brake according to claim 29, wherein the at least one pad retaining spring has at least one additional slot through which a guide protrusion of the pad rear plate extends.

31. The disc brake according to claim 5, wherein the at least one pad retaining spring is mounted on the top side of the pad rear plate by at least one spring retainer.

32. The disc brake according to claim 31, wherein the at least one spring retainer includes at least one retaining element, and the at least one pad retaining spring is located between the at least one retaining element and the top side of the pad rear plate in a prestressed condition.

33. The disc brake according to claim 32, wherein the at least one pad retaining spring includes at least one central section, transitional sections, at least one pressure section and at least one bearing section.

34. The disc brake according to claim 33, wherein the at least one bearing section is located on the top side of the pad rear plate, and the at least one pressure section extends laterally from a lateral end of the top side of the pad rear plate.

35. The disc brake according to claim 34, wherein the at least one pressure section is supported on the at least one brake carrier horn of the brake carrier.

36. The disc brake according to claim 31, wherein the at least one retaining element is a cable roller.

37. The disc brake according to claim 31, wherein the at least one pad retaining spring is formed from a spring wire.

38. The disc brake according to any one of claim 31, wherein
the at least one pad retaining spring is located on the lateral end and an opposite lateral end of the top side of the pad rear plate.

39. The disc brake according to claim 31, wherein the at least one spring retainer has a plate-shaped protrusion which protrudes radially away from the top side of the pad rear plate on which the at least one pad retaining spring is fastened.

40. The disc brake according to claim 39, wherein the at least one pad retaining spring has a hood form.

41. The disc brake according to claim 39, wherein the at least one pad retaining spring includes a base plate, two fastening straps extending from the base plate and spaced from one another a distance sufficient to receive the plate-shaped protrusion and a spring arm adjacent to the base plate, the spring arm including the portion of the at least one pressure section protruding beyond a lateral end of the top side of the par rear plate, and the fastening strap of the at least one pad retaining spring is located on the plate-shaped protrusion.

42. The disc brake according to claim 41, wherein the at least one pad retaining spring is located on the plate-shaped protrusion in a form-fitting manner.

43. The disc brake according to claim 42, wherein the at least one pad retaining spring is fixed on the plate-shaped protrusion.

44. The disc brake according to claim 41, wherein the spring arm of the at least pad retaining spring is connected to the base plate by a curved connecting section.

45. The disc brake according to claim 44, wherein the curved connecting section conforms to a lateral contact surface of the plate-like protrusion.

46. The disc brake according to claim 41, wherein the at least one pad retaining spring has at least one supporting section located on the base plate on a lateral side of the plate-like protrusion opposite the spring arm, and at least a portion of the at least one supporting section is supported on the top side of the pad rear plate.

47. The disc brake according to claim 41, wherein the spring arm of the at least one pad retaining spring includes at least one slot adjacent to the plate-like protrusion.

48. The disc brake according to any claim 41, wherein the at least one pad retaining spring includes at least one of a reinforcing bead and a reinforcing rib.

49. The disc brake according to claim 41, wherein the at least one pressure section protrudes laterally away from the pad rear plate on one end of the top side of the pad rear plate.

50. The disc brake according to claim 49, wherein the at least one pressure section is supported on the at least one brake carrier horn of the pad slot of the clamping side brake pad slot.

51. The disc brake according to claim 39, wherein the at least one pad retaining spring includes two pad retaining springs and each of the two pad retaining springs is arranged on a respective lateral end of the top side of the pad rear plate.

52. A brake pad set for a disc brake for a vehicle having a disc brake having a brake disc, a brake carrier and a brake caliper, comprising:

at least two brake pads, the at least two brake pads including a clamping side brake pad configured to be located in a clamping side brake pad slot of the brake carrier and a rear side brake pad configured to be located in a rear side brake pad slot of the brake carrier, and at least one pad retaining spring on at least the clamping side brake pad with at least one pressure section protruding laterally beyond a lateral end of a top side of a clamping side brake pad rear plate, the at least one pressure section being configured to be supported when in an installed position on the brake carrier on at least one clamping side brake carrier horn at a lateral side of the clamping side brake pad slot of the brake carrier, such that the at least one pad retaining spring exerts a radially outward tensile force on the clamping side brake pad.

* * * * *